US012786442B2

(12) United States Patent
Kim et al.

(10) Patent No.: US 12,786,442 B2
(45) Date of Patent: Nov. 3, 2026

(54) METHOD AND ELECTRONIC DEVICE PROCESSING DATA USING MIXED PRECISION NEURAL NETWORK MODEL

(71) Applicant: SAMSUNG ELECTRONICS CO., LTD., Suwon-si (KR)

(72) Inventors: Seungeon Kim, Suwon-si (KR); Seok Kang, Suwon-si (KR); Jeongwon Kim, Suwon-si (KR); Jun Hyuk Kim, Suwon-si (KR); Wonseop Song, Suwon-si (KR); Wonhee Lee, Suwon-si (KR); Woosuk Choi, Suwon-si (KR); Younghun Sung, Suwon-si (KR); Dokwan Oh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/028,761

(22) Filed: Jan. 17, 2025

(65) Prior Publication Data

US 2026/0059123 A1 Feb. 26, 2026

(30) Foreign Application Priority Data

Aug. 21, 2024 (KR) ........................ 10-2024-0111794

(51) Int. Cl.
*H04N 19/192* (2014.01)
*H04N 19/13* (2014.01)

(52) U.S. Cl.
CPC ........... *H04N 19/192* (2014.11); *H04N 19/13* (2014.11)

(58) Field of Classification Search
None
See application file for complete search history.

(56) References Cited

U.S. PATENT DOCUMENTS 11,153,586 B2 10/2021 Jun
11,336,908 B2 5/2022 Wierstra et al.
2019/0158834 A1 * 5/2019 Jung .................... H04N 19/197
(Continued)

FOREIGN PATENT DOCUMENTS

KR 10-2020-0065367 A 6/2020
KR 10-2025-0066362 A 5/2025

OTHER PUBLICATIONS

Communication dated Nov. 28, 2025 issued by the European Patent Office in European Patent Application No. 25180925.7.
(Continued)

*Primary Examiner* — Edemio Navas, Jr.
(74) *Attorney, Agent, or Firm* — Sughrue Mion, PLLC

(57) ABSTRACT

A method of processing data using a neural network model, including: receiving, by a first processor, input data; obtaining, by the first processor, first vector data in which the input data is encoded, wherein the first vector data is obtained from a first neural-network-based encoder by providing the input data as an input to the first neural-network-based encoder; converting, by the first processor, a first portion of the first vector data into first partial vector data having a first bit depth; converting, by the first processor, a second portion of the first vector data into second partial vector data having a second bit depth different from the first bit depth; and generating, by the first processor, encoded data based on the first partial vector data and the second partial vector data.

20 Claims, 14 Drawing Sheets

100

(56) References Cited

U.S. PATENT DOCUMENTS

| | | | | |
|---|---|---|---|---|
| 2020/0395955 | A1* | 12/2020 | Choi | G06N 3/08 |
| 2021/0336632 | A1* | 10/2021 | Bergland | H04N 19/182 |
| 2023/0419555 | A1 | 12/2023 | Minnen et al. | |
| 2024/0073435 | A1* | 2/2024 | Rippel | G06V 10/774 |
| 2025/0150640 | A1 | 5/2025 | Kim et al. | |

OTHER PUBLICATIONS

Johannes Ballé et al., "Variational image compression with a scale hyperprior", ICLR 2018, arXiv:1802.01436v2 [eess.IV], May 1, 2018, 23 pages, https://doi.org/10.48550/arXiv.1802.01436.

Zhengxue Cheng et al., "Learned Lossless Image Compression With a Hyperprior and Discretized Gaussian Mixture Likelihoods", ICASSP 2020—2020 IEEE International Conference on Acoustics, Speech and Signal Processing (ICASSP), arXiv:2002.01657v1 [eess.IV], Feb. 5, 2020, 6 pages, doi: 10.1109/ICASSP40776.2020.9053413.

Sungchul Yoon et al., "Optimized Lossless Embedded Compression for Mobile Multimedia Applications", Electronics 2020, vol. 9, No. 868, May 23, 2020, 16 pages, https://doi.org/10.3390/electronics9050868.

* cited by examiner

FIG. 12
Data encoding device
1210
First processor
1215
Network
1230
Data decoding device
1220
Second processor
1225

METHOD AND ELECTRONIC DEVICE PROCESSING DATA USING MIXED PRECISION NEURAL NETWORK MODEL

CROSS-REFERENCE TO RELATED APPLICATION

This application is based on and claims priority under 35 U.S.C. § 119 Korean Patent Application No. 10-2024-0111794, filed on Aug. 21, 2024, in the Korean Intellectual Property Office, the disclosure of which is incorporated by reference herein in its entirety.

BACKGROUND

1. Field

The disclosure relates to a method of processing data using a neural network model, and an electronic device for performing the same.

2. Description of the Related Art

As technologies utilizing neural network models (which may be referred to as neural networks) are rapidly developing, video compression and reconstruction technologies based on neural network models are also rapidly developing. A neural codec may operate by learning the features of input data using a neural network model, and compressing and reconstructing the input data based on the features. Entropy coding may be used in a neural codec to increase data compression efficiency and reduce transmission bandwidth.

SUMMARY

One or more embodiments may address at least the above problems and/or disadvantages and other disadvantages not described above. Also, the embodiments are not required to overcome the disadvantages described above, and an embodiment may not overcome any of the problems described above.

In accordance with an aspect of the disclosure, a method of processing data using a neural network model, the method includes: receiving, by a first processor, input data; obtaining, by the first processor, first vector data in which the input data is encoded, wherein the first vector data is obtained from a first neural-network-based encoder by providing the input data as an input to the first neural-network-based encoder; converting, by the first processor, a first portion of the first vector data into first partial vector data having a first bit depth; converting, by the first processor, a second portion of the first vector data into second partial vector data having a second bit depth different from the first bit depth; and generating, by the first processor, encoded data based on the first partial vector data and the second partial vector data.

The method may further include: receiving, by a second processor, the encoded data; and obtaining, by the second processor, reconstructed data corresponding to the input data by performing decoding on the first partial vector data and the second partial vector data using a first neural-network-based decoder.

Each of the first portion and the second portion may include a vector value included in different channel groups from among vector values of a plurality of channels included in the first vector data, and the first bit depth may be greater than the second bit depth.

The encoded data may be generated by quantizing merged data in which the first partial vector data and the second partial vector data are merged.

The method may further include: generating, by the first processor, a bitstream by entropy-encoding the encoded data.

The method may further include: obtaining, by the first processor, second vector data in which the input data is encoded, the second vector data may be obtained from a second neural-network-based encoder by providing the input data as an input to the second neural-network-based encoder; and converting, by the first processor, the second vector data into converted second vector data having a third bit depth.

The third bit depth may be smaller than the first bit depth and greater than the second bit depth.

A data size of the converted second vector data having the third bit depth may be same as a data size of the first vector data including the first partial vector data having the first bit depth and the second partial vector data having the second bit depth.

The generating of the encoded data may include: selecting, by the first processor, a vector value to be included in the encoded data using a neural-network-based selector based on the input data, and the vector value may be selected from among a first vector value having the first bit depth included in the first partial vector data, a second vector value having the second bit depth included in the second partial vector data, and a third vector value having the third bit depth included in the converted second vector data,.

The encoded data may include the selected vector value and identification data for identifying a decoder for decoding the selected vector value.

The method may further include: receiving, by a second processor, the encoded data and the identification data; selecting, by the second processor, the decoder from among a plurality of decoders based on the identification data; and obtaining, by the second processor, reconstructed data corresponding to the input data by performing decoding on the vector value using the selected decoder, and the plurality of decoders may include a first decoder corresponding to the first neural-network-based encoder and a second decoder corresponding to the second neural-network-based encoder.

The input data may include image data, the encoded data may include encoded image data, and the reconstructed data may include reconstructed image data that is generated by performing the decoding on the encoded image data.

The encoded data may be provided to the second processor by being transmitted from the first processor to the second processor, or being output from the first processor, stored in a memory, and then transmitted to the second processor, and the first processor, the second processor, and the memory may be included in a system-on-chip (SoC) module.

In accordance with an aspect of the disclosure, a method of processing data using a neural network model includes: receiving, by a first processor, input data; obtaining, by the first processor, first vector data in which the input data is encoded, wherein the first vector data is obtained from a first neural-network-based encoder by providing the input data as an input to the first neural-network-based encoder; converting, by the first processor, the first vector data into converted first vector data having a first bit depth; obtaining, by the first processor, second vector data in which the input data is encoded, wherein the second vector data is obtained from a second neural-network-based encoder by providing the input data as an input to the second neural-network-based encoder; converting, by the first processor, the second vector data into converted second vector data having a second bit depth; selecting, by the first processor, a vector value to be included in encoded data from among a vector value having the first bit depth included in the converted first vector data and a vector value having the second bit depth included in the converted second vector data, using a neural-network-based selector based on the input data; and generating, by the first processor, the encoded data including the selected vector value and identification data indicating a decoder for decoding the selected vector value.

The method may further include: receiving, by a second processor, the encoded data and the identification data; selecting, by the second processor, the decoder for decoding the vector value from among a plurality of decoders based on the identification data; and obtaining, by the second processor, reconstructed data corresponding to the input data by performing the decoding on the vector value using the selected decoder, and the plurality of decoders may include a first decoder corresponding to the first neural-network-based encoder and a second decoder corresponding to the second neural-network-based encoder.

In accordance with an aspect of the disclosure, an electronic device for processing data includes: a first processor; and a memory configured to store instructions which, when executed by the first processor, cause the first processor to: receive input data; obtain first vector data in which the input data is encoded, the first vector data may be obtained from a first neural-network-based encoder by providing the input data as an input to the first neural-network-based encoder; convert a first portion of the first vector data into first partial vector data having a first bit depth, and convert a second portion of the first vector data into second partial vector data having a second bit depth different from the first bit depth; and generate encoded data based on the first partial vector data and the second partial vector data.

The electronic device may further include a second processor, and the memory may be further configured to store instructions which, when executed by the second processor, cause the second processor to: receive the encoded data; and obtain reconstructed data corresponding to the input data by performing decoding on the first partial vector data and the second partial vector data using a first neural-network-based decoder.

The instructions may further cause the first processor to: obtain second vector data in which the input data is encoded, the second vector data may be obtained from a second neural-network-based encoder by providing the input data as an input to the second neural-network-based encoder; and convert the second vector data into converted second vector data having a third bit depth, and the third bit depth may be smaller than the first bit depth and greater than the second bit depth.

The instructions further cause the first processor to: select a vector value to be included in the encoded data from among a vector value having the first bit depth included in the first partial vector data, a vector value having the second bit depth included in the second partial vector data, and a vector value having the third bit depth included in the converted second vector data, using a neural-network-based selector with the input data as an input; and generate the encoded data including the selected vector value and identification data for identifying a decoder for decoding the selected vector value.

The electronic device may further include: a second processor, and the memory may be further configured to store instructions which, when executed by the second processor, cause the second processor to: receive the encoded data and the identification data; select the decoder for decoding the vector value from among a plurality of decoders based on the identification data; and obtain reconstructed data corresponding to the input data by performing the decoding on the vector value using the selected decoder, and the plurality of decoders may include a first decoder corresponding to the first neural-network-based encoder and a second decoder corresponding to the second neural-network-based encoder.

In accordance with an aspect of the disclosure, a method of processing data using a neural network model includes: receiving input data; obtaining first vector data in which the input data is encoded by providing the input data to a first neural-network-based encoder; converting a first portion of the first vector data into first partial vector data having a first bit depth; converting a second portion of the first vector data into second partial vector data having a second bit depth different from the first bit depth; generating encoded data based on the first partial vector data and the second partial vector data, and transmitting the encoded data to a receiving apparatus.

The encoded data may be decoded by the receiving apparatus by providing the first partial vector data and the second partial vector data to a first neural-network based decoder corresponding to the first neural-network-based encoder.

Additional aspects of embodiments will be set forth in part in the description which follows and, in part, will be apparent from the description, or may be learned by practice of the disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
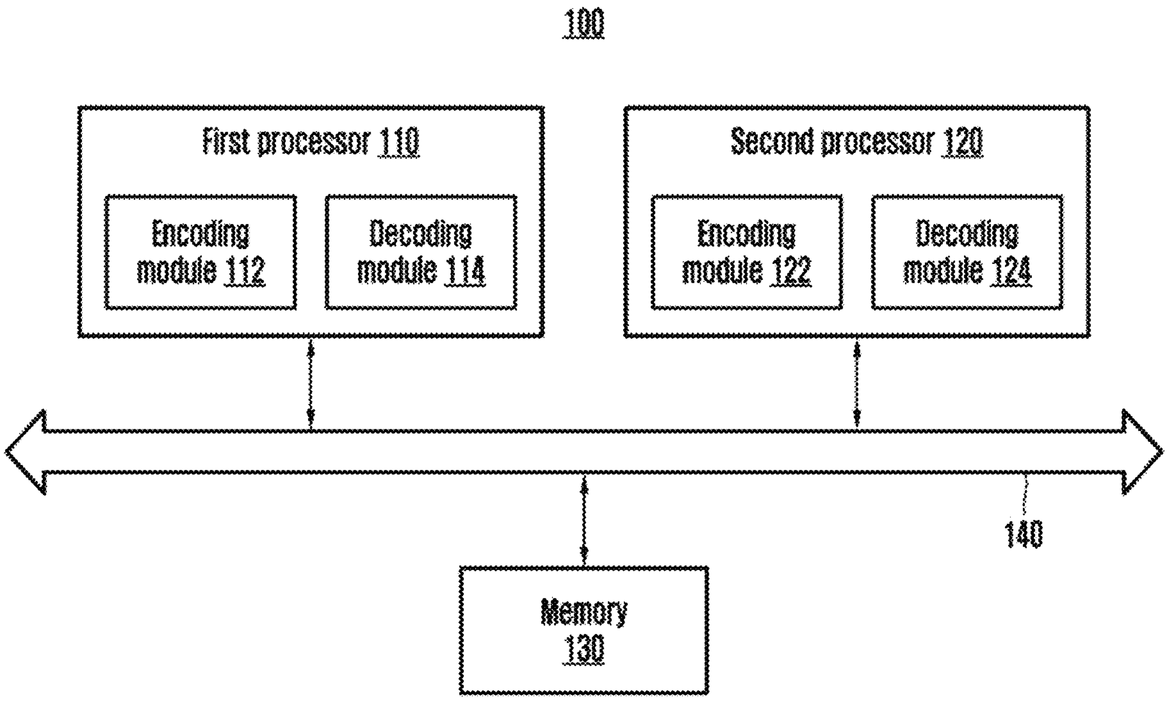
FIG. 1 is a diagram illustrating components of an electronic device for performing a data processing method according to an embodiment.

The following detailed structural or functional description is provided as an example only and various alterations and modifications may be made to the embodiments. Accordingly, the embodiments are not construed as limited to the disclosure and should be understood to include all changes, equivalents, and replacements within the idea and the technical scope of the disclosure.

Terms, such as first, second, and the like, may be used herein to describe components. Each of these terminologies is not used to define an essence, order, or sequence of a corresponding component but used merely to distinguish the corresponding component from one or more other components. For example, a first component may be referred to as a second component, or similarly, the second component may be referred to as the first component.

It should be noted that when it is described that one component is "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

As used in connection with embodiments of the disclosure, the term "module" may include a unit implemented in hardware, software, or firmware, and may interchangeably be used with other terms, for example, "logic," "logic block," "part," or "circuitry. " A module may refer to a code block for performing a specific function or operation and may form a larger program through interaction with other modules or form a software system. Also, the module may refer to a hardware component or device for independently performing a function, and such a module may be combined with other hardware to form the entire system. A module may be a single integral component, or a minimum unit or part thereof, adapted to perform one or more functions. For example, the module may be implemented in a form of an application-specific integrated circuit (ASIC).

Also, the term "or" may refer to inclusive "or", instead of exclusive "or". For example, the expression "X includes A or B" may correspond to "X includes A", "X includes B", or "X includes both A and B". Also, It should be noted that the term "and/or" used herein may refer to and include all possible combinations of one or more items of listed related items.

Unless otherwise defined, all terms, including technical and scientific terms, used herein have the same meaning as commonly understood by one of ordinary skill in the art to which this disclosure pertains. Terms, such as those defined in commonly used dictionaries, should be construed to have meanings matching with contextual meanings in the relevant art, and are not to be construed to have an ideal or excessively formal meaning unless otherwise defined herein.

Hereinafter, embodiments are described in detail with reference to the accompanying drawings. When describing the embodiments with reference to the accompanying drawings, like reference numerals refer to like elements and a repeated description related thereto may be omitted. Some of operations of flowcharts described herein may be performed simultaneously or in parallel to another operation and the order of operations may change. In addition, some of the operations may be omitted or another operation may be additionally performed.

FIG. 1 is a diagram illustrating components of an electronic device for performing a data processing method according to an embodiment.

Referring to FIG. 1, an electronic device 100 may include a first processor 110, a second processor 120, and a memory 130. The components of the electronic device 100 may communicate with each other through a communication bus 140. The first processor 110, the second processor 120, the memory 130, and the communication bus 140 may be included in a system-on-chip (SoC). In embodiments, the SoC may be referred to as an SoC module. Some of the components may be omitted from the electronic device 100, or another component may be added to the electronic device 100. For example, the electronic device 100 may include the first processor 110 and the memory 130 and may not include the second processor 120.

The first processor 110 and the second processor 120 may perform various data processing and operations. For example, as at least a part of data processing or operations, the first processor 110 and the second processor 120 may store instructions and/or data received from another component in the memory 130, process the instructions and/or the data stored in the memory 130, and store processed results in the memory 130. The first processor 110 and the second processor 120 may include at least one of a central processing unit (CPU), a graphics processing unit (GPU), a neural network processing unit (NPU), a media processing unit (MPU), a data processing unit (DPU), a vision processing unit (VPU), a video processor, an image processor, a display processor, a microprocessor, a processor core, a multi-core processor, an ASIC, a field programmable gate array (FPGA), and any combination thereof.

The memory 130 may store data used by the components (e.g., the first processor 110 and the second processor 120) of the electronic device 100. The data may include, for example, a program (e.g., an application), and input data and/or output data related thereto. The memory 130 may include a volatile memory and/or a non-volatile memory. The memory 130 may store instructions executable by the first processor 110 and/or the second processor 120. When the instructions stored in the memory 130 are executed by the first processor 110 and/or the second processor 120, the first processor 110 and/or the second processor 120 may perform the operations described herein.

The first processor 110 may include an encoding module 112 that may encode data to generate encoded data and/or a decoding module 114 that may encode encoded data generated by another component (e.g., the second processor 120) to generate reconstructed data. The second processor 120 may include an encoding module 122 that may encode data to generate encoded data and/or a decoding module 124 that may decode encoded data generated by another component (e.g., the first processor 110) to generate reconstructed data.

Figure 4:
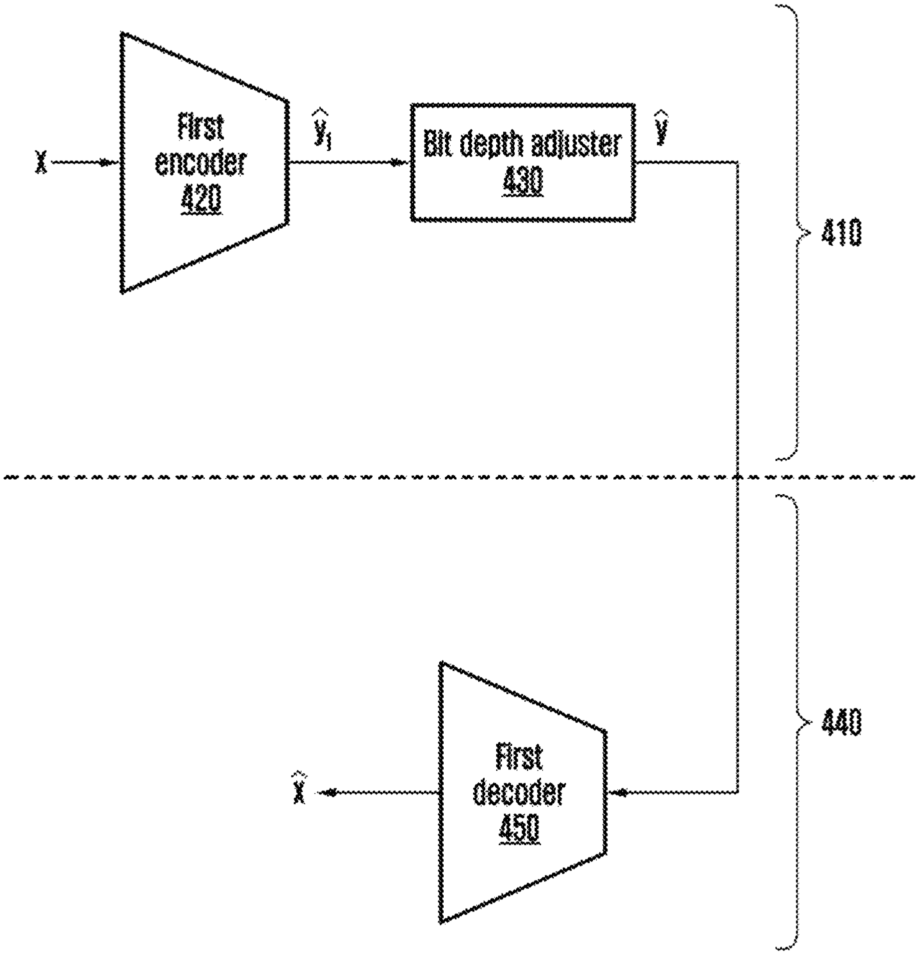
FIG. 4 is a diagram illustrating a structure for encoding and decoding data using an encoder and a decoder according to an embodiment.
Figure 7:
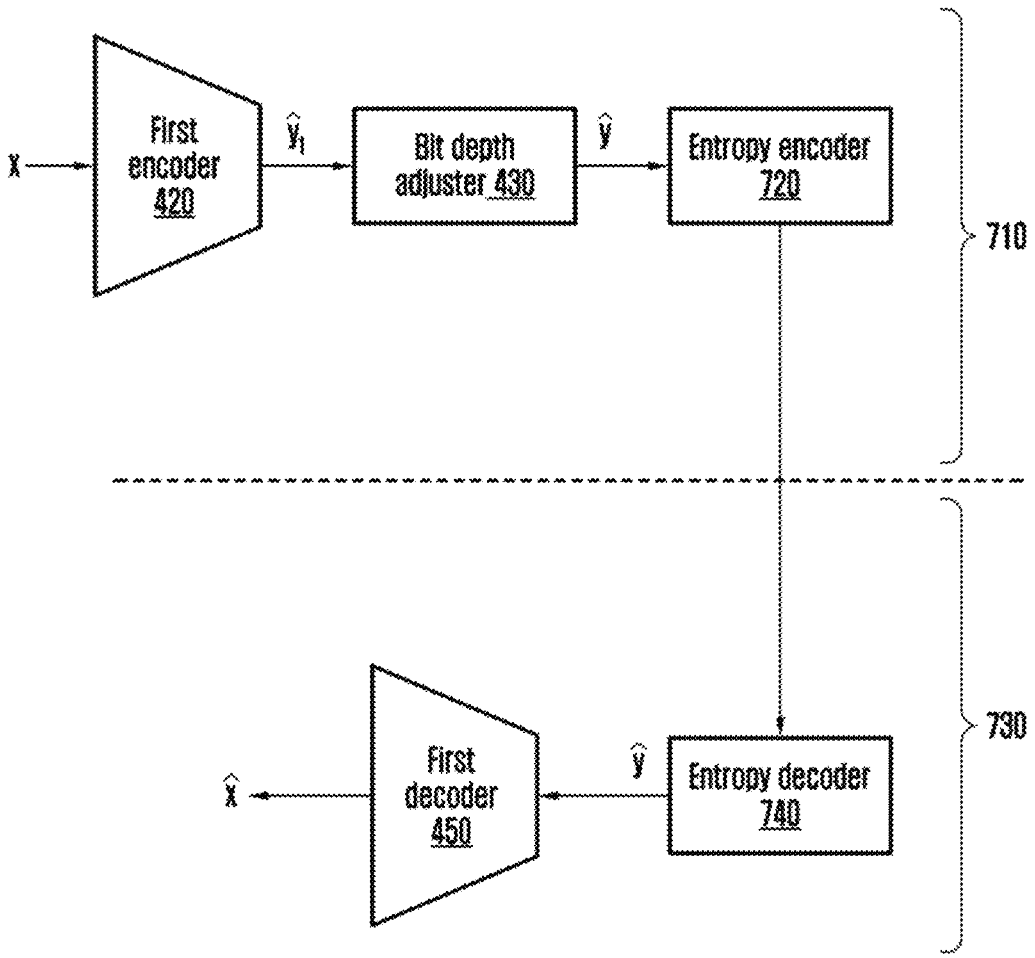
FIG. 7 is a diagram illustrating a structure for encoding decoding including an entropy encoder and an entropy decoder according to an embodiment.
Figure 11:
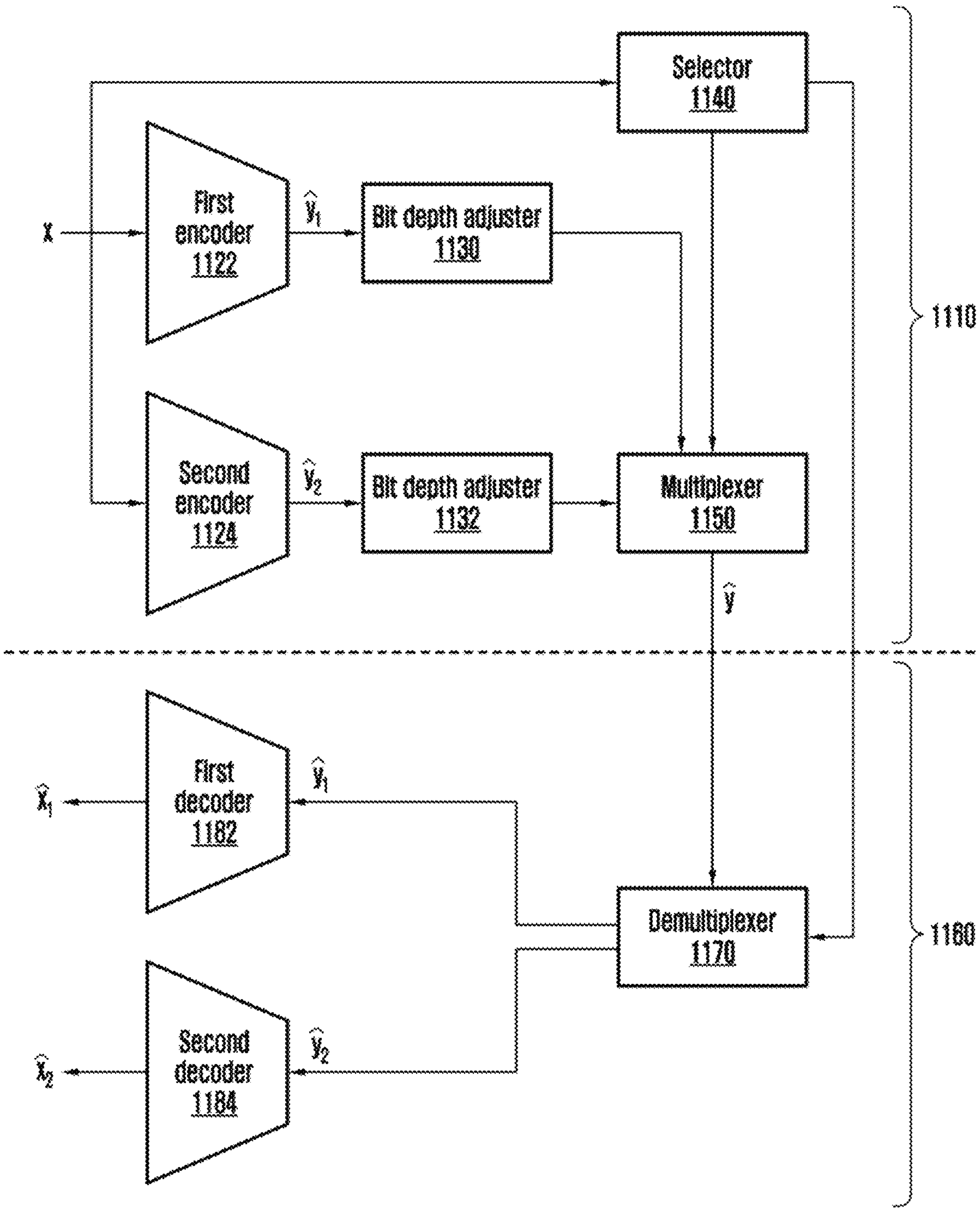
FIG. 11 is a diagram illustrating a structure for encoding and decoding data using a plurality of encoders and a plurality of decoders according to an embodiment.

The encoding module 112 (which may correspond to, for example, at least one of an encoding module 410 of FIG. 4, an encoding module 710 of FIG. 7, and an encoding module 1110 of FIG. 11) of the first processor 110 may encode input data input to the encoding module 112 and generate encoded data. The input data may include at least one of image data, video data, audio data, and any combination thereof, but embodiments are not limited thereto. When the type of input data is an image, the input data may include pixel values of pixels included in a local region (e.g., a block region) of the image. The encoding module 112 may include an encoder based on a neural network model (e.g., a first encoder 420 of FIGS. 4 and 7, a first encoder 1122 and a second encoder 1124 of FIG. 11) that converts input data into vector (e.g., latent vector) data with a smaller dimension. In embodiments, the encoder based on a neural network model may be referred to as a neural-network-based encoder. The encoding module 112 may include one or more encoders.

The encoding module 112 may receive input data, and obtain first vector data in which input data is encoded from a first encoder based on a neural network model by inputting the input data to the first encoder (e.g., the first encoder 420 of FIGS. 4 and 7). In embodiments, the first encoder based on a neural network model may be referred to as a first neural-network-based encoder. In embodiments, inputting data to an element may refer to at least one of feeding the data to the element, and otherwise providing the data as an input to the element. The encoding module 112 may convert a first portion of the first vector data into first partial vector data having a first bit depth, and convert a second portion of the first vector data into second partial vector data having a second bit depth that is different from the first bit depth. In embodiments, a bit depth may be referred to as bit-precision. Each of the first portion and the second portion of the first vector data may include a vector value included in different channel groups among vector values of a plurality of channels included in the first vector data. The first vector data may include a plurality of channel groups, each of which includes a vector value, and each channel group may be referred to as a chunk. When the first vector data includes eight channels, for example, a channel 1 to a channel 8, four channels (e.g., the channel 1 to a channel 4) may correspond to the first portion of the first vector data, and four channels (e.g., a channel 5 to the channel 8 may correspond to the second portion of the first vector data.

In an embodiment, the encoding module 112 may adjust the bit depth of vector values included in the first vector data through bit clamping. For example, the encoding module 112 may perform bit clamping to clamp the vector values included in the first portion of the first vector data to four bits, and perform bit clamping to clamp the vector values included in the second portion of the first vector data to eight bits.

The bit depth may determine an accuracy and a range of data expressed in bits. The bit depth may indicate the amount of information contained in each element of data. As the bit depth increases, each element of data may contain more information. The bit depth may indicate the number of bits used to indicate or represent a vector value (e.g., a latent vector value) contained in the encoded data, and the size and precision of the vector value may be determined by a designated bit depth. The first bit depth may be greater than the second bit depth, but embodiments are not limited thereto. For example, according to an embodiment, the first bit depth may be smaller than the second bit depth.

The encoding module 112 may generate the encoded data based on the first partial vector data and the second partial vector data. The encoding module 112 may, for example, generate the encoded data by quantizing merged data in which the first partial vector data and the second partial vector data are merged (e.g., concatenated). The vector values of the encoded data generated through the above process may not all have uniform bit depths, and may for example have mixed bit depths. For example, a specific vector value may have a greater bit depth, and other vector values may have smaller bit depth.

The encoded data generated by the first processor 110 may be transmitted from the first processor 110 to the second processor 120, or output from the first processor 110, stored in the memory 130 (e.g., a buffer memory in the memory 130), and then transmitted to the second processor 120. The encoded data may be transmitted to the memory 130 or the second processor 120 using the communication bus 140. The encoded data may be transmitted in the form of a bitstream. According to an embodiment, the encoded data may be entropy-encoded by an entropy encoder (e.g., an entropy encoder 720 of FIG. 7) and then transmitted in the form of a bitstream. The entropy encoding may be an encoding method that changes a length of code indicating or representing a symbol according to an occurrence probability of the symbol corresponding to the vector values grouped by channel unit. Short code may be assigned to a symbol that occurs frequently by the entropy encoding and long code may be assigned to a symbol that rarely occurs. Statistical redundancy of the input data may be removed through the entropy encoding.

The second processor 120 may receive the encoded data, and generate reconstructed data (which may for example be referred to as decoded data or decompressed data) by performing decoding based on the received encoded data. When the second processor 120 receives a bitstream generated through the entropy encoding, the decoding module 124 of the second processor 120 (which may correspond to, for example, a decoding module 440 of FIG. 4, a decoding module 730 of FIG. 7, or a decoding module 1160 of FIG. 11) may perform entropy decoding on the received bitstream. The entropy decoding may be performed by an entropy decoder (e.g., an entropy decoder 740 of FIG. 7) included in a decoding module. The encoded data included in the bitstream may be reconstructed by the entropy decoding.

The decoding module 124 may obtain reconstructed data corresponding to the input data by performing decoding on the first partial vector data having the first bit depth and the second partial vector data having the second bit depth included in the encoded data using a first decoder (e.g., a first decoder 450 of FIGS. 4 and 7) based on a neural network model. In embodiments, the first decoder based on a neural network model may be referred to as a first neural-network-based decoder.

An encoding-decoding structure used to encode and decode data may include only one encoder and one decoder, but embodiments are not limited thereto, and there may also be a plurality of encoders and/or a plurality of decoders. When there are a plurality of encoders and decoders, each decoder may be paired with a corresponding one of the encoders. For example, when the plurality of encoders include a first encoder and a second encoder, there may be a plurality of decoders which may include a first decoder corresponding to the first encoder and a second decoder corresponding to the second encoder. The first encoder and the first decoder may be referred to as a first pair or a first encoder-decoder pair, and the second encoder and the second decoder may be referred to as a second pair, or a second encoder-decoder pair. The number of decoders may be equal to or smaller than the number of encoders, but embodiments are not limited thereto. For example, there may be a plurality of encoders but only one decoder.

As described above, the encoding module 112 may receive the input data, and obtain the first vector data in which the input data is encoded from the first encoder by inputting the received input data to the first encoder (e.g., the first encoder 1122 of FIG. 11). The encoding module 112 may convert the first portion of the first vector data into the first partial vector data having the first bit depth, and convert the second portion of the first vector data into the second partial vector data having the second bit depth different from the first bit depth. The encoding module 112 may obtain the second vector data in which the input data is encoded from a second encoder based on a neural network model by inputting the input data to the second encoder. In embodiments, the second encoder based on a neural network model may be referred to as a second neural-network-based encoder. The encoding module 112 may convert the second vector data into converted second vector data having a third bit depth. The third bit depth may be smaller than the first bit depth and greater than the second bit depth. For example, the first bit depth may be eight bits, the second bit depth may be four bits, and the third bit depth may be six bits. The second vector data may have a same data size as the first vector data (e.g., a size of the second vector data may be same as a size of the first vector data). A compression ratio of the first vector data including the first partial vector data having the first bit depth and the second partial vector data having the second bit depth may be the same as a compression ratio of the converted second vector data having the third bit depth. In the above example, the first vector data is described as being converted into two pieces of partial vector data of different bit depths, but embodiments are not limited thereto. The first vector data may be converted into three or more pieces of partial vector data with different bit depths.

The encoding module 112 may select a vector value to be included in the encoded data from among a vector value having the first bit depth included in the first partial vector data, a vector value having the second bit depth included in the second partial vector data, and a vector value having the third bit depth included in the converted second vector data using a selector (e.g., a selector 1140 of FIG. 11) based on a neural network model with the input data as an input. In embodiments, the selector based on a neural network model may be referred to as a neural-network-based selector. The encoding module 112 may generate the encoded data including the selected vector value and identification data for identifying a decoder to decode the selected vector value. The identification data may include a flag value or an index value for identifying a decoder that may perform the decoding on each vector value included in the encoded data among a plurality of decoders corresponding to the encoders. The flag value or the index value of the identification data may be a value for identifying a specific encoder-decoder pair among a plurality of encoder-decoder pairs.

According to another embodiment, the encoding module 112 may not only convert the first portion of the first vector data into the first partial vector data having the first bit depth, and convert the second portion of the first vector data into the second partial vector data having the second bit depth different from the first bit depth. In addition, the encoding module 112 may also convert a first portion of the second vector data into third partial vector data having the third bit depth, and convert a second portion of the second vector data into fourth partial vector data having a fourth bit depth. The third bit depth may be greater than the first bit depth, and the fourth bit depth may be smaller than the second bit depth. For example, the first bit depth may be eight bits, the second bit depth may be four bits, the third bit depth may be ten bits, and the fourth bit depth may be two bits, but embodiments are not limited thereto. A compression ratio of the first vector data including the first partial vector data having the first bit depth and the second partial vector data having the second bit depth may be the same as a compression ratio of the second vector data including the third partial vector data having the third bit depth and the fourth partial vector data having the fourth bit depth. The encoding module 112 may select a vector value to be included in the encoded data among a vector value having the first bit depth included in the first partial vector data, a vector value having the second bit depth included in the second partial vector data, a vector value having the third bit depth included in the third partial vector data, and a vector value having the fourth bit depth included in the fourth partial vector data using a selector (e.g., the selector 1140 of FIG. 11) based on a neural network model with the input data as an input. The encoding module 112 may generate the encoded data including the selected vector value and identification data for identifying a decoder to decode the selected vector value. In this example each of the first vector data and the second vector data are described as being converted into two pieces of partial vector data of different bit depths, but embodiments are not limited thereto. Each of the first vector data and the second vector data may be converted into three or more pieces of partial vector data with different bit depths.

According to still another embodiment, the encoding module 112 may receive input data, and may obtain first vector data in which the input data is encoded from a first encoder by inputting the received input data to the first encoder (e.g., the first encoder 1122 of FIG. 11). The encoding module 112 may convert the first vector data into converted first vector data having the first bit depth. The encoding module 112 may obtain second vector data in which the input data is encoded from a second encoder based on a neural network model by inputting the input data to the second encoder. The encoding module 112 may convert the second vector data into converted second vector data having the second bit depth. The second bit depth may be different from the first bit depth. For example, the first bit depth may be six bits, and the second bit depth may be four bits. A compression ratio of the converted first vector data having the first bit depth may be different from a compression ratio of the converted second vector data having the second bit depth. Accordingly, the sizes of the first vector data and the second vector data may be different from each other.

The encoding module 112 may select a vector value to be included in the encoded data among a vector value having the first bit depth included in the converted first vector data and a vector value having the second bit depth included in the converted second vector data using a selector (e.g., the selector 1140 of FIG. 11) based on a neural network model with the input data as an input. The encoding module 112 may generate the encoded data including the selected vector value and identification data for identifying a decoder to decode the selected vector value. The identification data may include a flag value or an index value for identifying a decoder to perform the decoding on each vector value included in the encoded data among a plurality of decoders corresponding to the encoders.

In embodiments according to the example above, the encoded data and the identification data generated from the first processor 110 may be transmitted from the first processor 110 to the second processor 120, or may be output from the first processor 110, stored in the memory 130 (e.g., a buffer memory in the memory 130), and then transmitted to the second processor 120. The encoded data and the identification data may be transmitted to the memory 130 or the second processor 120 using the communication bus 140. The encoded data and the identification data may be transmitted in the form of a bitstream. According to an embodiment, the encoded data and the identification data may be entropy-encoded by an entropy encoder and then transmitted in the form of a bitstream.

The second processor 120 may generate reconstructed data by performing the decoding based on the received encoded data and identification data. When the second processor 120 receives a bitstream generated through the entropy encoding, the decoding module 124 of the second processor 120 (e.g., the decoding module 1160 of FIG. 11) may perform entropy decoding on the received bitstream. The decoding module 124 of the second processor 120 may receive the encoded data and the identification data, and select the decoder to decode the vector value included in the encoded data among a plurality of decoders based on the identification data. The decoding module 124 may obtain reconstructed data corresponding to the input data by performing decoding on the vector value included in the encoded data using the selected decoder. The decoding module 124 may perform the decoding process by identifying a decoder to decode the encoded data among the decoders based on a value (e.g., a flag value or an index value) of the identification data and inputting the encoded data to the identified decoder.

In the above example, the encoding process is described as being performed by the encoding module 112 of the first processor 110 and the decoding process is described as being performed by the decoding module 124 of the second processor 120. However, this is for convenience of description, and embodiments are not limited thereto. The encoding process may be performed by the encoding module 122 of the second processor 120, and the decoding process may be performed by the decoding module 114 of the first processor 110.

Each of the encoding module 112 and the encoding module 122 may be referred to as a neural encoder, and each of the decoding module 114 and the decoding module 124 may be referred to as a neural decoder. The neural encoder may be applied to various devices that compress images (or videos), and neural decoder may be applied to various devices that reconstruct compressed images (or videos). The encoding module 112 and the decoding module 114 may perform one or more functions of a neural codec, and the encoding module 122 and the decoding module 124 may also perform one or more functions of a neural codec. The first processor 110 and/or the second processor 120 capable of performing the functions of the neural codec described above may be implemented in at least one of a personal computer (PC), a display device (e.g., a television (TV) or a projector), a streaming service server, a content storage device, and/or a portable device. The portable device may include, for example, a laptop computer, a mobile phone, a smartphone, a tablet PC, a mobile Internet device (MID), a personal digital assistant (PDA), an enterprise digital assistant (EDA), a digital still camera, a digital video camera, a portable multimedia player (PMP), a personal navigation device or portable navigation device (PND), a handheld game console, an e-book, and/or a smart device. The smart device may include at least one of a smart watch, a smart band, and/or a smart ring.

In an embodiment, the data processing between the first processor 110 and the second processor 120 may be performed in a frame buffer compression (FBC) environment that compresses image data (or video data) between an intellectual property (IP) (e.g., a GPU, an NPU, a video processor, or a display processor) within an SoC and transmits the image data through the memory 130 (e.g., a dynamic random-access memory (DRAM)). Here, the memory 130 may include a frame buffer for temporarily storing compressed image data. When image data is transmitted to another IP, the image data may be compressed and transmitted according to a footprint constraint, which may refer to a maximum data size limit per block region. According to an example in which the data size of the image data to be transmitted is 192 bytes and the footprint constraint is 50%, the maximum data size that the compressed image data may have when the image data is compressed and transmitted may be 96 bytes. The footprint constraint may cause constraint on the bit depth (or bit-precision) that determines a size of a latent vector value and a precision of the latent vector value transmitted between IPs. Due to the footprint constraint, it may be difficult to increase compression performance although the neural network capacity (e.g., the number of layers or the number of parameters) of an encoder and/or a decoder implemented as a neural network model.

According to embodiments described herein, by compressing data by forming bit depths of vector values (e.g., latent vector values) included in encoded data in a mixed manner, it is possible to satisfy the footprint constraint while providing improved performance (e.g., an image reconstructed with higher image quality or a high compression ratio) compared to a case where vector values included in encoded data are configured with a single bit depth. In addition, according to certain embodiments, by compressing data appropriately using a plurality of encoders and decoders with different characteristics, it is possible to satisfy the footprint constraint while providing improved performance (e.g., an image reconstructed with higher image quality or a high compression ratio) compared to a case of using only one encoder, while satisfying the footprint constraint. In embodiments, power consumption may be reduced by reducing a bandwidth between an IP and a memory within a SoC by improving the data compression ratio. When compressing and transmitting an image, a block region, which may be a local region within the image, may be selected by a random access technology for loading and processing only a necessary block region rather than the entire image, and a compression process may be performed on the selected block region.

The embodiments described herein may be applied to an FBC technology based on a neural network model. In addition, the embodiments may be applied to various applications having an encoder-decoder structure as well as image compression. For example, the embodiments may be applied to a system with a limited number of dictionaries, such as a vector quantized variational autoencoder (VQ-VAE) structure, and may also be applied to video compression or audio compression.

Figure 2:
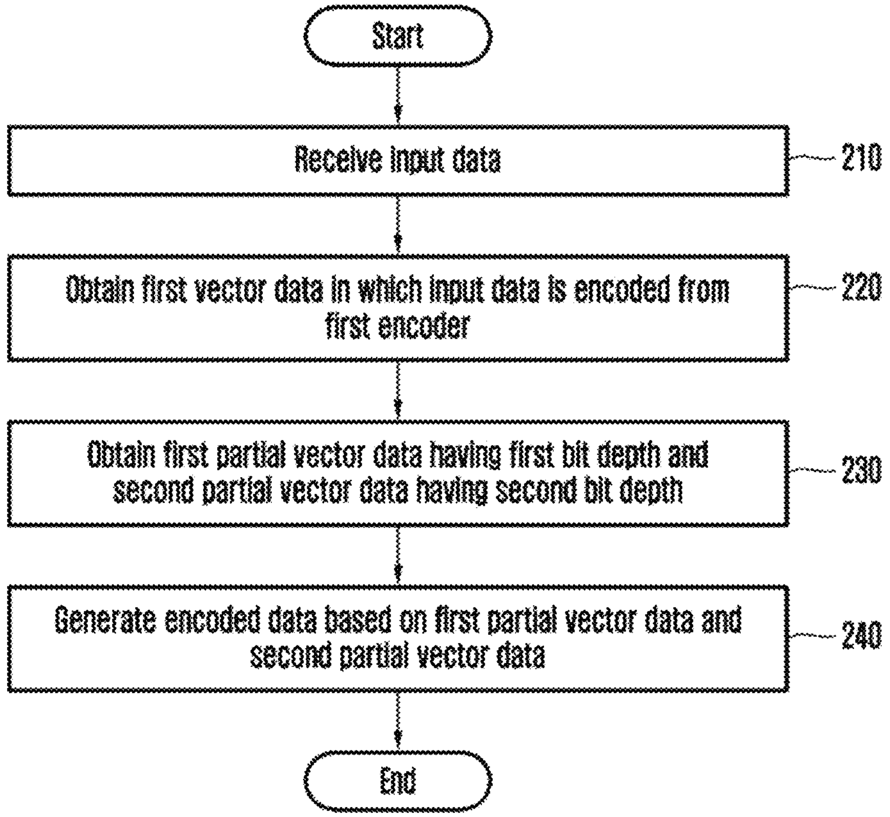
FIG. 2 is a flowchart illustrating operations of a data processing method of encoding data using a neural network model according to an embodiment.

FIG. 2 is a flowchart illustrating operations of a data processing method of encoding data using a neural network model according to an embodiment. The data processing method may be performed by a first processor (e.g., the first processor 110 of FIG. 1 or a first processor 1310 of FIG. 13) included in the electronic device described herein (e.g., the electronic device 100 of FIG. 1 or an electronic device 1300 of FIG. 13), or a first processor (e.g., a first processor 1215 of FIG. 12) included in a data encoding device (e.g., a data encoding device 1210 of FIG. 12).

Referring to FIG. 2, at operation 210, the first processor may receive input data. The input data may include at least one of image data, video data, audio data, and any combination thereof.

At operation 220, the first processor may obtain first vector data in which the input data is encoded from a first encoder (e.g., the first encoder 420 of FIGS. 4 and 7) based on a neural network model (e.g., the first neural-network-based encoder) by inputting the input data to the first encoder. The first vector data may include a latent vector value corresponding to the input data.

At operation 230, the first processor may obtain first partial vector data having a first bit depth and second partial vector data having a second bit depth by adjusting bit depths of vector values included in the first vector data. The first bit depth may be different from the second bit depth. For example, the first bit depth may be greater than the second bit depth. The first processor may convert a first portion of the first vector data into the first partial vector data having the first bit depth, and convert a second portion of the first vector data into the second partial vector data having the second bit depth different from the first bit depth. Each of the first portion and the second portion of the first vector data may include a vector value included in different channel groups among vector values of a plurality of channels included in the first vector data. Through bit clamping, the first processor may convert a bit depth of vector values included in the first portion of the first vector data into the first bit depth, and convert a bit depth of vector values included in the second portion of the first vector data into the second bit depth.

At operation 240, the first processor may generate encoded data based on the first partial vector data having the first bit depth and the second partial vector data having the second bit depth. The first processor may generate the encoded data corresponding to the input data by quantizing merged data in which the first partial vector data and the second partial vector data are merged. When the encoded data is generated, the encoded data may be transmitted to a second processor. The encoded data may be transmitted to the second processor in the form of a bitstream. When the first processor is included in the SoC, the first processor may transmit a bitstream including the encoded data to the second processor (e.g., the second processor 120 of FIG. 1) or to the second processor through a memory (e.g., the memory 130 of FIG. 1). When the first processor is included in a data encoding device (e.g., a data encoding device 1210 of FIG. 12), the first processor may transmit a bitstream including the encoded data to a data decoding device (e.g., a data decoding device 1220 of FIG. 12 or an electronic device 1400 of FIG. 14) using a network (e.g., a wireless network).

Figure 3:
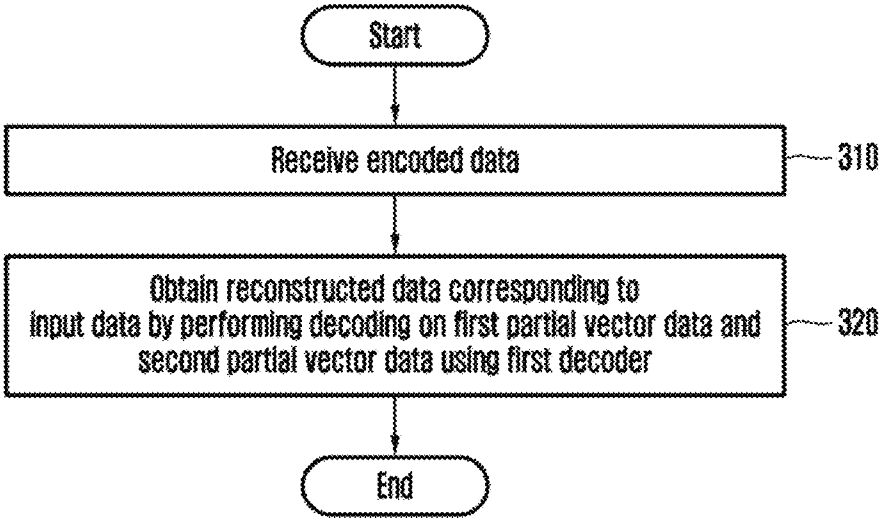
FIG. 3 is a flowchart illustrating operations of a data processing method of decoding encoded data according to an embodiment.

FIG. 3 is a flowchart illustrating operations of a data processing method of decoding encoded data according to an embodiment. The data processing method may be performed by a second processor (e.g., the second processor 120 of FIG. 1 or a second processor 1410 of FIG. 14) included in the electronic device described herein (e.g., the electronic device 100 of FIG. 1 or the electronic device 1400 of FIG. 14) or a second processor (e.g., a second processor 1225 of FIG. 12) included in a data decoding device (e.g., the data decoding device 1220 of FIG. 12). Operations shown in FIG. 3 may be performed after the operations shown in FIG. 2.

Referring to FIG. 3, at operation 310, the second processor may receive the encoded data. The encoded data may be generated by the operations of FIG. 2.

At operation 320, the second processor may obtain reconstructed data corresponding to the input data by performing decoding on the first partial vector data having the first bit depth and the second partial vector data having the second bit depth included in the encoded data using a first decoder (e.g., the first decoder 450 of FIG. 4) based on a neural network model (e.g., the first neural-network-based decoder). The second processor may input first vector data including bit values of different bit depths to the first decoder, and obtain reconstructed data corresponding to the output data of the first decoder from the first decoder.

FIG. 4 is a diagram illustrating a structure for encoding and decoding data using an encoder and a decoder according to an embodiment.

Referring to FIG. 4, the encoding module 410 (e.g., the encoding module 112 or the encoding module 122 of FIG. 1) may generate encoded data $\hat{y}$ by encoding input data x. The input data x may include, for example, pixel values of pixels included in the entire region or in a local region (e.g., a block region or a subblock region) of an image. The encoding module 410 may include the first encoder 420 (e.g., the first neural-network-based encoder) and a bit depth adjuster 430.

The first encoder 420 may be implemented as a neural network model (e.g., a deep neural network). The first encoder 420 may be a neural network model including, for example, a convolutional layer. In this specification, a neural network model may refer to a model in which artificial neurons (or nodes) that form a network by combining synapses have problem-solving capabilities by changing the strength of the synapse combination through training or machine learning. The artificial neurons of the neural network model may include a combination of a weight and/or bias, and the neural network may include one or more layers composed of a plurality of artificial neurons. The neural network model may include at least one of a convolutional neural network (CNN), a recurrent neural network (RNN), a perceptron, a multilayer perceptron, a feed forward (FF), a radial basis network (RBF), a deep feed forward (DFF), a long short-term memory (LSTM), a gated recurrent unit (GRU), an auto encoder (AE), a variational auto encoder (VAE), a denoising auto encoder (DAE), a sparse auto encoder (SAE), a Markov chain (MC), a Hopfield network (HN), a Boltzmann machine (BM), a restricted Boltzmann machine (RBM), a deep belief network (DBN), a deep convolutional network (DCN), a deconvolutional network (DN), a deep convolutional inverse graphics network (DCIGN), a generative adversarial network (GAN), a liquid state machine (LSM), an extreme learning machine (ELM), an echo state network (ESN), a deep residual network (DRN), a differentiable neural computer (DNC), a neural turning machine (NTM), a capsule network (CN), a Kohonen network (KN), a binarized neural network (BNN), an attention network (AN), and any combination thereof. The first encoder 420 may be trained by unsupervised learning or self-supervised learning.

The first encoder 420 may encode input data x, and generate first vector data $\hat{y}_1$ including a vector value (e.g., a latent vector value) corresponding to the input data x. The first encoder 420 may extract an important feature of input data x, and compress the extracted feature into a vector value having a data size smaller than that of the input data x (or a vector value having a reduced dimension than that of the input data x). The first vector data $\hat{y}_1$ is the compressed input data x, and the data size thereof may be smaller than that of the input data x.

The bit depth adjuster 430 may adjust bit depths of vector values included in the first vector data $\hat{y}_1$. For example, the bit depth adjuster 430 may convert vector values included in a first channel group of the first vector data $\hat{y}_1$ into vector values having the first bit depth, and convert vector values included in a second channel group of the first vector data $\hat{y}_1$ into vector values having the second bit depth that is different from the first bit depth through bit clamping (or clipping, bit quantization). Through this, first partial vector data having the first bit depth and second partial vector data having the second bit depth may be obtained. Each vector value included in the first vector data $\hat{y}_1$ may be limited to a specific range of values by the bit depth adjuster 430. According to an embodiment, the bit depth adjuster 430 may divide the vector values included in the first vector data $\hat{y}_1$ into a plurality of groups according to a spatial domain, and convert vector values between the groups into vector values of different bit depths. In this case, the vector values included in the first vector data $\hat{y}_1$ may be divided into different groups according to spatial features (e.g., positions). In addition, the bit depth adjuster 430 may divide the vector values included in the first vector data $\hat{y}_1$ into different groups according to the spatial domain and a channel domain. For example, the vector values included in the first vector data $\hat{y}_1$ may be divided into different groups according to channels, and the vector values belonging to each channel group may be divided into different groups according to the spatial features. Also, the bit depth adjuster 430 may convert the bit depth for each vector value included in the first vector data $\hat{y}_1$, not by group unit.

In an embodiment, according to an example, the input data x may be 12-bit image data having dimensions of 32 (width)×4 (height), the first bit depth may be four bits, and the second bit depth may be eight bits. Accordingly, the first encoder 420 may compress the corresponding image data into a latent vector value having dimensions of 16 (channel)×8 (width)×1 (height). The bit depth adjuster 430 may convert vector values included in the first channel group of eight channels among sixteen channels of the latent vector values into a bit depth of four bits, and convert vector values included in the second channel group of the remaining 8 channels into a bit depth of eight bits. Each data of the first channel group and the second channel group may have dimensions of 8 (channel)×8 (width)×1 (height). The encoded data $\hat{y}$ including the bit values of such mixed bit depths has the same size as the encoded data in which all the vector values have a bit depth of six bits, and may further include important information of the data compared to the encoded data composed of the vector values of a single bit depth of six bits. Reconstructed data $\hat{x}$ obtained by decoding the encoded data $\hat{y}$ through this may have a peak signal-to-noise ratio (PSNR) higher than that of reconstructed data obtained by decoding the vector values of the single bit depth of six bits. In this example, for convenience of description, the vector values of the first vector data $\hat{y}_1$ are described as being converted into two different bit depths, but embodiments are not limited thereto. The vector values of the first vector data $\hat{y}_1$ may also be converted into three or more different bit depths (e.g., three bit depths such as a 4-bit bit depth, a 6-bit bit depth, and an 8-bit bit depth), four bit depths such as a 2-bit bit depth, a 4-bit bit depth, a 6-bit bit depth, and an 8-bit bit depth). The optimal bit depth configuration applied to generate the encoded data may vary depending on the characteristics of data to be compressed.

Merged data, in which the first partial vector data having the first bit depth and the second partial vector data having the second bit depth are merged, may be quantized within a specific data size. The quantization may include quantization of applying a rounding operation, scalar quantization, vector quantization, and/or embedded quantization, but embodiments are not limited thereto. As the bit depth adjustment and the quantization are performed, the first vector data including the vector values of different bit depths including vector values (encoded vector values) may be included in the encoded data $\hat{y}$. The encoded data $\hat{y}$ may include a vector value encoded for each input data x.

The decoding module 440 may generate the reconstructed data $\hat{x}$ corresponding to the input data x by performing decoding on the encoded data $\hat{y}$. The decoding module 440 may include the first decoder 450 based on a neural network model (e.g., the first neural-network-based decoder). The first decoder 450 may be a neural network model including, for example, a transposed convolutional layer. The first decoder 450 may be trained by unsupervised learning or self-supervised learning methods. The encoded data $\hat{y}$ may be input to the first decoder 450, and the reconstructed data $\hat{x}$ including decoded vector values may be output from the first decoder 450. The first decoder 450 may generate the reconstructed data $\hat{x}$ corresponding to the input data x by performing the decoding on the encoded vector value. Original data may be reconstructed from vector values (e.g., latent vector values) through the decoding processing of the first decoder 450.

According to embodiments, the input data x may be image data, and the encoded data $\hat{y}$ may be encoded image data. The reconstructed data $\hat{x}$ may be reconstructed image data generated by performing the decoding on the encoded image data.

In the series of processes for performing encoding-decoding described above, the transmittable size (dimension) of vector values, such as the footprint constraint, may be determined in advance. The encoding module 410 may implement vector values included in the encoded data $\hat{y}$ not as a single bit depth but as vector values having different bit depths, while satisfying the condition for a maximum data size that the encoded data $\hat{y}$ may have. Even when a single neural codec including the first encoder 420 and the first decoder 450 is used, as in the example illustrated in FIG. 4, the vector values included in the encoded data $\hat{y}$ may have a plurality of different bit depths through the bit depth adjuster 430.

The first encoder 420 may be trained to dispose vector values of at least one piece of input data x that is determined to be relatively important from among a plurality of pieces of input data x in a channel converted to a high bit depth, and dispose vector values of at least one piece of input data x that is determined to be relatively less important in a channel converted to a lower bit depth. In a case of image compression, through such a method, the vector values for key regions with a large amount of information (e.g., a high-contrast region, an edge region, a contour region, and a text region) in an image may be disposed in channels that are converted into higher bit depths, while the vector values for the other regions may be disposed in channels that are converted into lower bit depths.

The first encoder 420 and the first decoder 450 may be trained together. A loss used in the training may be defined as, for example, a weighted sum of a distortion loss that minimizes a difference between reconstructed data and input data (original data) and a rate loss that minimizes the amount of vector values transmitted, but embodiments are not limited thereto. For example, when the weighted sum of the distortion loss and the rate loss is a total loss, parameters (e.g., a connection weight and bias between nodes) of the first encoder 420 and the first decoder 450 may be updated in a way of minimizing such a total loss. An error back-propagation algorithm and gradient descent in machine learning may be used to update parameters.

Figure 5:
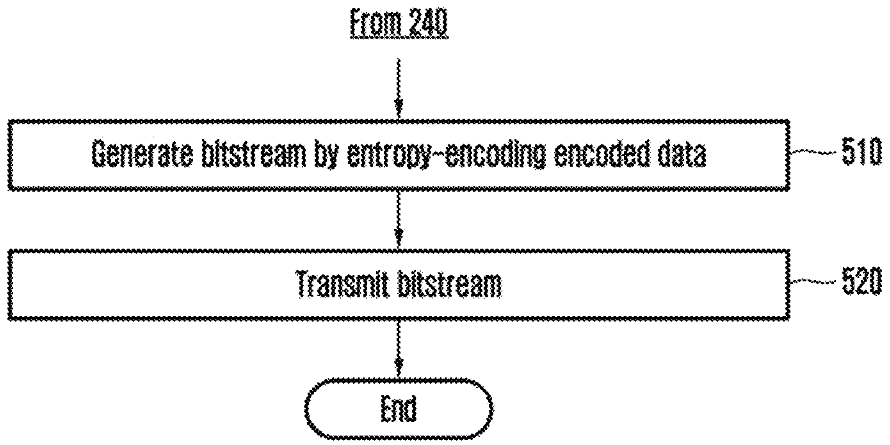
FIG. 5 is a flowchart illustrating operations of a data processing method including entropy encoding according to an embodiment.

FIG. 5 is a flowchart illustrating operations of a data processing method including entropy encoding according to an embodiment. Operations shown in FIG. 5 may be performed after the operations shown in FIG. 2.

Referring to FIG. 5, at operation 510, the first processor may generate a bitstream by entropy-encoding the encoded data generated at operation 240 of FIG. 2. An additional gain of the compression rate may be achieved through the entropy encoding. The entropy encoding may refer to an encoding method that reduces an average number of bits by changing a bit length according to a frequency or probability of occurrence of data during a process of converting each element of data into a bit string. As the entropy encoding, for example, Huffman coding and/or arithmetic coding may be used. Through the entropy encoding, the average number of bits of vector values included in the encoded data may be reduced, thereby improving storage and transmission efficiency.

The first processor may perform the entropy encoding using an entropy encoder (e.g., the entropy encoder 720 of FIG. 7). The entropy encoder may perform information-based compression using a probability distribution. The probability distribution may be, for example, estimated through probability modeling during a training process of a first encoder (e.g., the first encoder 420 of FIG. 7) and a first decoder (e.g., the first decoder 450 of FIG. 7), or determined based on a histogram obtained after training.

At operation 520, the first processor may transmit a bitstream. The first processor may transmit a bitstream so that the second processor receives the bitstream. The encoded data may be compressed into a bitstream through the entropy encoding and then transmitted to the second processor.

Figure 6:
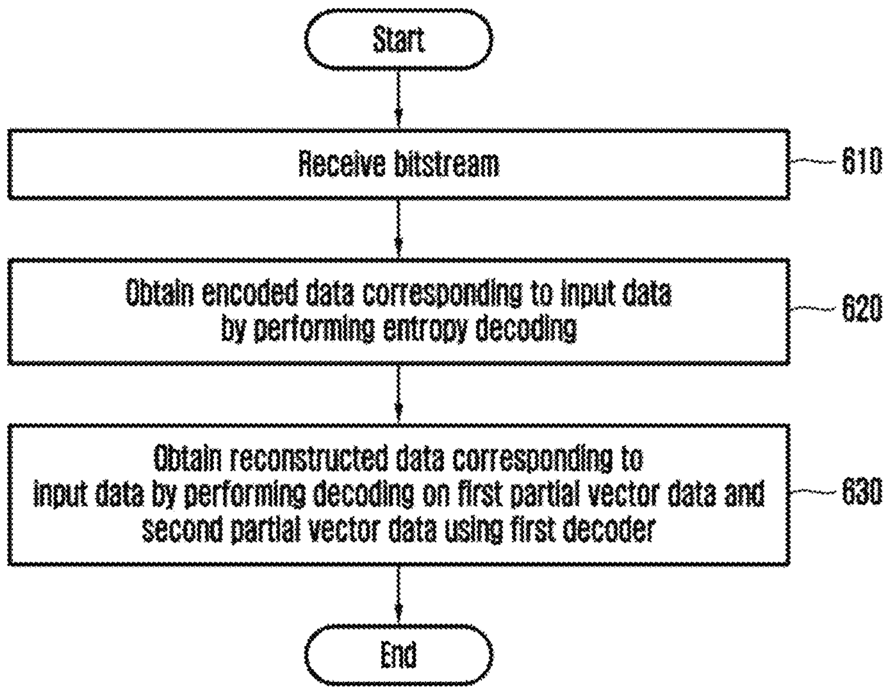
FIG. 6 is a flowchart illustrating operations of a data processing method including entropy decoding according to an embodiment.

FIG. 6 is a flowchart illustrating operations of a data processing method including entropy decoding according to an embodiment. Operations shown in FIG. 6 may be performed after the operations shown in FIG. 5.

Referring to FIG. 6, at operation 610, the second processor may receive the bitstream generated by the first processor. The bitstream is generated by the operations of FIG. 5 and may include the encoded data on which the entropy encoding is performed.

At operation 620, the second processor may obtain the encoded data corresponding to the input data by performing entropy decoding on the bitstream. The second processor may perform the entropy decoding using an entropy decoder (e.g., the entropy decoder 740 of FIG. 7). The second processor may reconstruct the encoded data without loss through the entropy decoding.

At operation 630, the second processor may obtain reconstructed data corresponding to the input data by performing decoding on the first partial vector data having the first bit depth and the second partial vector data having the second bit depth included in the encoded data using the first decoder (e.g., the first decoder 450 of FIG. 7) based on the neural network model (e.g., the first neural-network-based decoder).

FIG. 7 is a diagram illustrating a structure for encoding and decoding including an entropy encoder and an entropy decoder according to an embodiment.

Referring to FIG. 7, the encoding module 710 (e.g., the encoding module 112 and the encoding module 122 of FIG. 1) may generate encoded data $\hat{y}$ by encoding input data x, and additionally perform the entropy encoding on the encoded data $\hat{y}$. The encoding module 410 may include a first encoder 420, a bit depth adjuster 430, and an entropy encoder 720.

The first encoder 420 may be implemented as a neural network model. The first encoder 420 may encode the input data x to generate first vector data $\hat{y}_1$ including a vector value (e.g., a latent vector value) corresponding to the input data x. The bit depth adjuster 430 may adjust bit depths of vector values included in the first vector data $\hat{y}_1$. For example, the bit depth adjuster 430 may convert vector values included in a first channel group of the first vector data $\hat{y}_1$ into vector values having the first bit depth, and convert vector values included in a second channel group of the first vector data $\hat{y}_1$ into vector values having the second bit depth that is different from the first bit depth through bit clamping. Merged data, in which the first partial vector data having the first bit depth and the second partial vector data having the second bit depth are merged, may be quantized within a specific data size. As the bit depth adjustment and the quantization are performed, the first vector data including the vector values of different bit depths may be included in the encoded data $\hat{y}$. The encoded data $\hat{y}$ may include a vector value encoded for each input data x. The first encoder 420 and the bit depth adjuster 430 may correspond to the first encoder 420 and the bit depth adjuster 430 described above with reference to FIG. 4, respectively. The entropy encoder 720 may further compress the encoded data $\hat{y}$ by performing the entropy encoding (e.g., the Huffman coding or the arithmetic coding) on the encoded data $\hat{y}$. The bitstream generated through the entropy encoding may be transmitted to the decoding module 730.

The decoding module 440 may generate the reconstructed data $\hat{x}$ corresponding to the input data x by performing the decoding on the encoded data $\hat{y}$ included in the bitstream. The decoding module 440 may include the entropy decoder 740 and the first decoder 450 based on a neural network model. The entropy decoder 740 may reconstruct the encoded data $\hat{y}$ corresponding to the input data by performing the entropy decoding on the bitstream. The first decoder 450 may decode the encoded data $\hat{y}$, and output reconstructed data $\hat{x}$ including the decoded vector values.

In an example encoding-decoding structure, there may be one encoder and one decoder as illustrated in FIG. 4, or there may be a plurality of encoders and decoders as illustrated in FIG. 11 described below. When there are a plurality of encoders and decoders, each decoder may have a pair relationship with one of the encoders. For example, a first encoder may form a first pair with a first decoder, and a second encoder may form a second pair with a second decoder. The number of decoders may be equal to or less than the number of encoders, but embodiments are not limited thereto. For example, there may be a plurality of encoders but only one decoder, and each encoder may have a pair relationship with one decoder.

In a case where there are a plurality of encoders and decoders, the encoding operation may include an operation of determining whether to transmit a vector value output from one of the encoders to a decoding side, and an operation of generating identification data for identifying a decoder to decode the vector value determined to be transmitted. In a decoding operation, an operation of generating reconstructed data by inputting the vector value included in the encoded data to a decoder identified by the identification data among a plurality of decoders may be performed. Hereinafter, examples are described in more detail with reference to the drawings.

Figure 8:
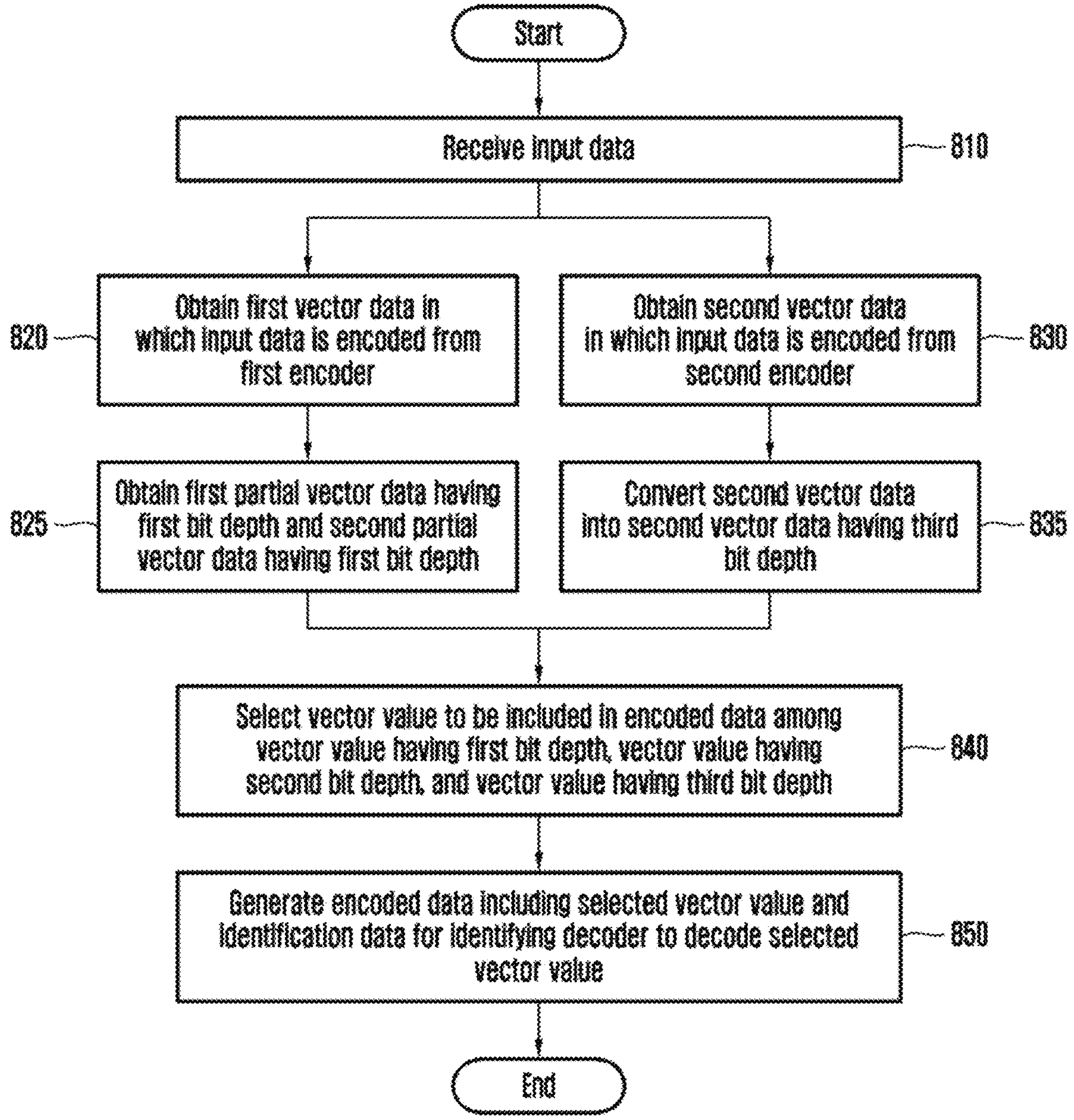
FIGS. 8 and 9 are flowcharts illustrating operations of a data processing method of encoding data based on a plurality of encoders according to an embodiment.

FIG. 8 is a flowcharts illustrating operations of a data processing method of encoding data based on a plurality of encoders according to an embodiment. The data processing method may be performed by a first processor (e.g., the first processor 110 of FIG. 1 or the first processor 1310 of FIG. 13) included in the electronic device described herein (e.g., the electronic device 100 of FIG. 1 or the electronic device 1300 of FIG. 13), or a first processor (e.g., the first processor 1215 of FIG. 12) included in a data encoding device (e.g., the data encoding device 1210 of FIG. 12).

Referring to FIG. 8, at operation 810, the first processor may receive input data. The input data may include at least one of image data, video data, audio data, and any combination thereof.

At operation 820, the first processor may obtain first vector data in which the input data is encoded from a first encoder based on a neural network model (e.g., the first neural-network-based encoder) by inputting the input data to the first encoder (e.g., the first encoder 1122 of FIG. 11).

At operation 825, the first processor may obtain first partial vector data having a first bit depth and second partial vector data having a second bit depth by adjusting a bit depth of vector values included in the first vector data. The first bit depth may be different from the second bit depth.

Operations 810, 820, and 835 may correspond to operations 210, 220, and 230 of FIG. 2, respectively.

At operation 830, the first processor may obtain second vector data in which the input data is encoded from a second encoder based on a neural network model (e.g., the second neural-network-based encoder) by inputting the input data to the second encoder (e.g., the second encoder 1124 of FIG. 11).

At operation 835, the first processor may convert the second vector data into converted second vector data having a third bit depth. The third bit depth may be smaller than the first bit depth and greater than the second bit depth. For example, the first bit depth may be eight bits, the second bit depth may be four bits, and the third bit depth may be six bits. A compression ratio of the first encoder may be the same as a compression ratio of the second encoder, and the first encoder and the second encoder may implement a fixed length coding structure. The converted second vector data having the third bit depth may have the same data size as the first vector data including the first partial vector data having the first bit depth and the second partial vector data having the second bit depth. Accordingly, the first vector data obtained from the first encoder may be converted into vector values of mixed bit depths (e.g., 4-bit/8-bit mixed), and the second vector data obtained from the second encoder may be converted into vector values of a single bit depth (e.g., a 6-bit bit depth).

At operation 840, the first processor may select a vector value to be included in the encoded data among a vector value having the first bit depth included in the first partial vector data, a vector value having the second bit depth included in the second partial vector data, and a vector value having the third bit depth included in the converted second vector data using a selector (e.g., the selector 1140 of FIG. 11) based on a neural network model (e.g., the neural-network-based selector) with the input data as an input. The selector may select an optimal pair for encoding and decoding the input data among a first pair between the first encoder and a first decoder and a second pair between the second encoder and a second decoder based on the input data.

In another embodiment, the first processor may select an encoder to encode the input data from among a plurality of encoders using the selector (e.g., the selector 1140 of FIG. 11) with (or using) the input data as an input. The selector may, for example, select one encoder to perform the encoding on the input data among encoders. The selector may be a model trained to select an encoder among a plurality of encoders that is determined to be most suitable for encoding the input data based on input data input to the selector. The first processor may obtain vector data in which the input data is encoded from the selected encoder by encoding the input data using the selected encoder. Accordingly, the encoding may be performed in some of the encoders selected from among the encoders, rather than in all of the plurality of encoders.

At operation 850, the first processor may generate encoded data including the vector value selected at operation 840, and identification data for identifying a decoder to decode the selected vector value. The identification data may include a flag value or an index value for identifying a decoder to perform the decoding on the vector value included in the encoded data among the first decoder corresponding to the first encoder and the second decoder corresponding to the second encoder. The flag value or the index value of the identification data may be a value for identifying a specific encoder-decoder pair among a plurality of encoder-decoder pairs. Operations 840 and 850 may be included in operation 240 of FIG. 2.

Figure 9:
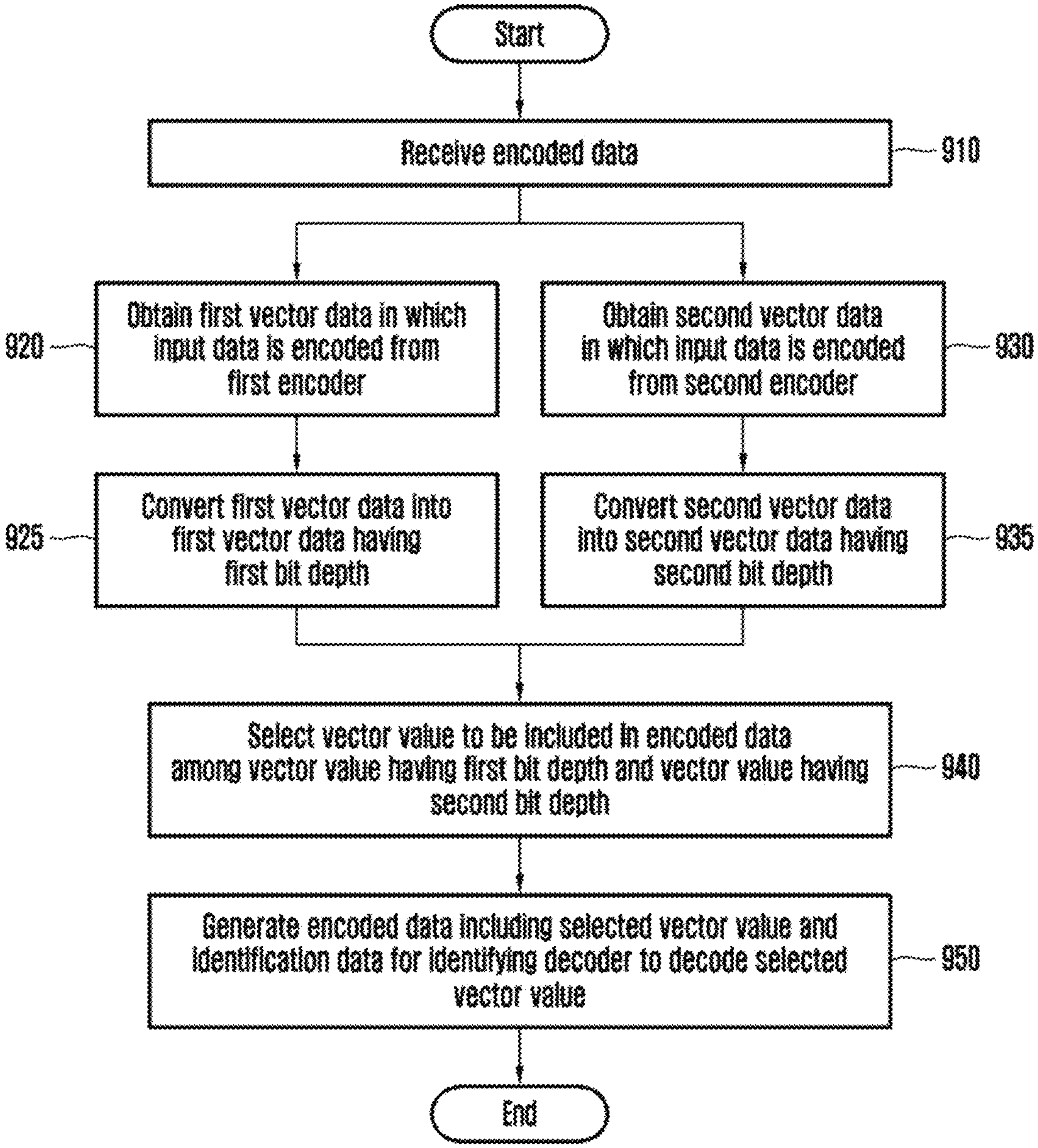

FIG. 9 is a flowchart illustrating operations of a data processing method of encoding data based on a plurality of encoders according to an embodiment. The data processing method may be performed by a first processor (e.g., the first processor 110 of FIG. 1 or the first processor 1310 of FIG. 13) included in the electronic device described herein (e.g., the electronic device 100 of FIG. 1 or the electronic device 1300 of FIG. 13), or a first processor (e.g., the first processor 1215 of FIG. 12) included in a data encoding device (e.g., the data encoding device 1210 of FIG. 12).

Referring to FIG. 9, at operation 910, the first processor may receive input data. The input data may include at least one of image data, video data, audio data, and any combination thereof.

At operation 920, the first processor may obtain first vector data in which the input data is encoded from a first encoder based on a neural network model (e.g., the first neural-network-based encoder) by inputting the input data to the first encoder (e.g., the first encoder 1122 of FIG. 11).

At operation 925, the first processor may convert the first vector data into converted first vector data having the first bit depth. The first processor may clamp (or quantize) the vector values included in the first vector data to limit each vector value to have the first bit depth.

At operation 930, the first processor may obtain second vector data in which the input data is encoded from a second encoder based on a neural network model (e.g., the second neural-network-based encoder) by inputting the input data to the second encoder (e.g., the second encoder 1124 of FIG. 11).

At operation 935, the first processor may convert the second vector data into converted second vector data having a second bit depth. The first bit depth and the second bit depth may be different from each other. For example, the first bit depth may be six bits, and the second bit depth may be four bits. In this embodiment, the first vector data obtained from the first encoder may be converted into vector values of a single bit depth (e.g., a 6-bit bit depth), and the second vector data obtained from the second encoder may also be converted into vector values of a single bit depth (e.g., a 4-bit bit depth). In this case, a compression ratio of the first encoder and a compression ratio of the second encoder may be different from each other, and the first encoder and the second encoder may implement a variable length coding structure. The compression ratio of the second encoder may be greater than the compression ratio of the first encoder, and the converted first vector data having the first bit depth may have a greater data size than the converted second vector data having the second bit depth.

At operation 940, the first processor may select a vector value to be included in the encoded data among a vector value having the first bit depth included in the converted first vector data and a vector value having the second bit depth included in the converted second vector data using a selector (e.g., the selector 1140 of FIG. 11) based on a neural network model (e.g., the neural-network-based selector) with the input data as an input. The selector may select an optimal pair for encoding and decoding the input data among a first pair between the first encoder and a first decoder and a second pair between the second encoder and a second decoder based on the input data.

In another embodiment, the first processor may select an encoder to encode the input data among a plurality of encoders using the selector (e.g., the selector 1140 of FIG. 11) with the input data as an input. The selector may, for example, select one encoder to perform the encoding on the input data among encoders. The first processor may obtain vector data in which the input data is encoded from the selected encoder by encoding the input data using the selected encoder.

At operation 950, the first processor may generate encoded data including the vector value selected at operation 940, and identification data for identifying a decoder to decode the selected vector value. The identification data may include a flag value or an index value for identifying a decoder to perform the decoding on the vector value included in the encoded data among the first decoder corresponding to the first encoder and the second decoder corresponding to the second encoder.

In an embodiment, the first processor may generate a bitstream corresponding to the input data by performing entropy encoding on the encoded data and the identification data generated according to the data processing method shown in FIG. 8 or 9.

The encoded data and the identification data may be transmitted to a second processor. When the first processor is included in an SoC, the first processor may transmit the bitstream including the encoded data and the identification data to the second processor, or may transmit the bitstream including the encoded data and the identification data to a memory (e.g., the memory 130 of FIG. 1), which may then transmit the bitstream including the encoded data and the identification data to the second processor. When the first processor is included in a data encoding device, the first processor may transmit the bitstream including the encoded data and the identification data to a data decoding device (e.g., the data decoding device 1220 of FIG. 12) using a network (e.g., a wireless network).

Figure 10:
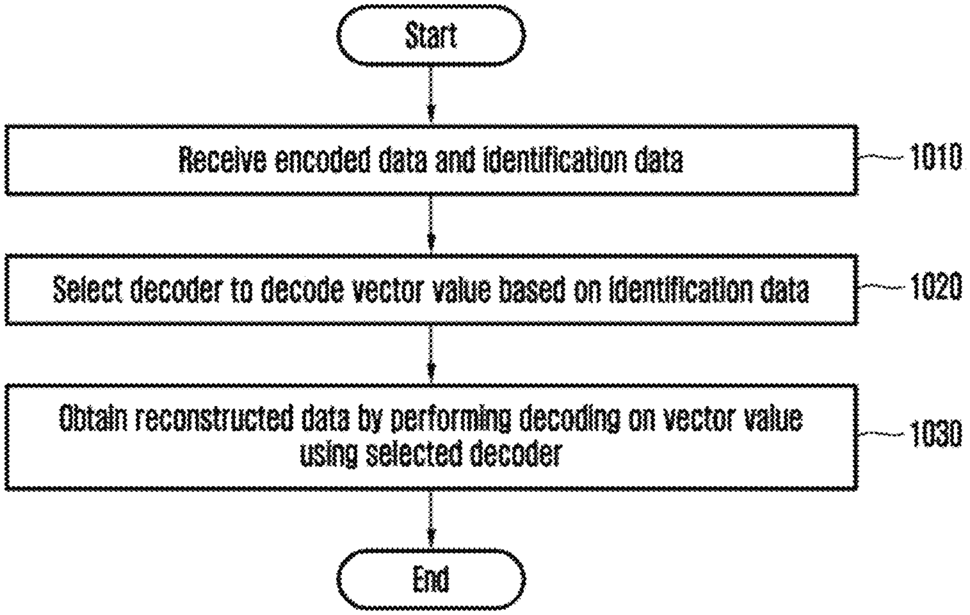
FIG. 10 is a flowchart illustrating operations of a data processing method of decoding encoded data generated through FIG. 8 or 9 according to an embodiment.

FIG. 10 is a flowchart illustrating operations of a data processing method of decoding encoded data generated through FIG. 8 or 9 according to an embodiment. The data processing method may be performed by a second processor (e.g., the second processor 120 of FIG. 1 or the second processor 1410 of FIG. 14) included in the electronic device described herein (e.g., the electronic device 100 of FIG. 1 or the electronic device 1400 of FIG. 14) or a second processor (e.g., the second processor 1225 of FIG. 12) included in a data decoding device (e.g., the data decoding device 1220 of FIG. 12). Operations shown in FIG. 10 may be performed after the operations shown in FIG. 8 or 9.

Referring to FIG. 10, at operation 1010, the second processor may receive the encoded data and the identification data. When the second processor receives the bitstream generated through the entropy encoding, the second processor may reconstruct the encoded data and the identification data by performing entropy decoding on the received bitstream.

At operation 1020, the second processor may select a decoder to decode the vector value included in the encoded data from among a plurality of decoders corresponding to the encoders based on the identification data.

At operation 1030, the second processor may obtain reconstructed data corresponding to the input data by performing decoding on the vector value included in the encoded data using the decoder selected at operation 1020. The second processor may identify the decoder to decode the encoded data among the decoders based on the value of the identification data (e.g., a flag value or an index value), and perform a decoding process using the identified decoder.

FIG. 11 is a diagram illustrating a structure for encoding and decoding data using a plurality of encoders and a plurality of decoders according to an embodiment.

Referring to FIG. 11, the encoding module 1110 may generate encoded data $\hat{y}$ by encoding input data x, and generate identification data for identifying a decoder to perform the decoding. The input data x may include, for example, pixel values of pixels included in the entire region or in a local region (e.g., a block region or a subblock region) of an image. The encoding module 1110 may include a plurality of encoders (e.g., the first encoder 1122 and the second encoder 1124), a bit depth adjuster 1130, a bit depth adjuster 1132, the selector 1140, and a multiplexer 1150.

Each of the first encoder 1122 (e.g., the first neural-network-based encoder) and the second encoder 1124 (e.g., the second neural-network-based encoder) may be implemented as a neural network model (e.g., a deep neural network). The first encoder 1122 and the second encoder 1124 may have the same or different neural network model structures. When the structures are the same, the first encoder 1122 and the second encoder 1124 may have different parameters (e.g., weights or biases) of the neural network model. The first encoder 1122 and the second encoder 1124 may be trained by unsupervised learning or self-supervised learning methods.

Each of the first encoder 1122 and the second encoder 1124 may encode the input data x to generate a vector value (e.g., a latent vector value) corresponding to the input data x. The first encoder 1122 and the second encoder 1124 may extract an important feature of the input data x, and compress the extracted feature into a vector value having a data size smaller than that of the input data x (or a vector value having a reduced dimension than the input data x). The first encoder 1122 may generate first vector data $\hat{y}_1$ by encoding the input data x, and the second encoder 1124 may generate second vector data by encoding the input data x. Each of the first vector data $\hat{y}_1$ and the second vector data $\hat{y}_2\hat{y}_2$may include a vector value that is quantized to a specific data size for transmission. The quantization may include quantization of applying a rounding operation, scalar quantization, vector quantization, and/or embedded quantization, but embodiments are not limited thereto.

Each of the first vector data $\hat{y}_1$ and the second vector data $\hat{y}_2$ may be decoded by a specific decoder. For example, the vector data $\hat{y}_1$ may be decoded by a first decoder 1182 (e.g., the first neural-network-based decoder), and the vector data $\hat{y}_2$ may be decoded by a second decoder 1184 (e.g., the second neural-network-based decoder). The first decoder 1182 and the second decoder 1184 may each have a pair relationship with one of the first encoder 1122 and the second encoder 1124. For example, the first encoder 1122 and the first decoder 1182 may form a first pair (e.g., a first encoder-decoder pair), and the second encoder 1124 and the second decoder 1184 may form a second pair (e.g., a second encoder-decoder pair). Although two encoder-decoder pairs are shown in FIG. 11, there may be three or more encoder-decoder pairs. Also, a plurality of encoders and one decoder may be provided. In this case, all encoders may be paired with one decoder.

The bit depth adjuster 1130 may adjust a bit depth of the first vector data $\hat{y}_1$, and the bit depth adjuster 1132 may adjust a bit depth of the second vector data $\hat{y}_2$.

In an embodiment, the bit depth adjuster 1130 may generate first partial vector data having the first bit depth and second partial vector data having the second bit depth by adjusting the bit depth of the vector values included in the first vector data $\hat{y}_1$. The first bit depth may be different from the second bit depth. The bit depth adjuster 1132 may generate the second vector data having the third bit depth by adjusting the bit depth of the vector values included in the second vector data $\hat{y}_2$. The third bit depth may be smaller than the first bit depth and greater than the second bit depth. The second vector data having the third bit depth may have the same data size as the first vector data including the first partial vector data having the first bit depth and the second partial vector data having the second bit depth. The selector 1140 (e.g., the neural-network-based selector) may determine a suitable vector value for compressing the input data x. The selector 1140 may select a vector value to be included in the encoded data $\hat{y}$ among a vector value having the first bit depth included in the first partial vector data, a vector value having the second bit depth included in the second partial vector data, and a vector value having the third bit depth included in the second vector data based on the input data x.

In another embodiment, the bit depth adjuster 1130 may generate the converted first vector data having the first bit depth by adjusting the bit depth of the vector values included in the first vector data $\hat{y}_1$. The bit depth adjuster 1132 may generate the converted second vector data having the second bit depth by adjusting the bit depth of the vector values included in the second vector data $\hat{y}_2$. The first bit depth may be different from the second bit depth. The converted first vector data having the first bit depth may have a larger data size than the converted second vector data having the second bit depth. The selector 1140 may select a vector value to be included in the encoded data $\hat{y}$ among the vector value having the first bit depth included in the converted first vector data and the vector value having the second bit depth included in the converted second vector data based on the input data x.

In another embodiment, the selector 1140 may select an encoder to encode the input data x among the first encoder 1122 and the second encoder 1124 based on the input data x. The selector 1140 may select one encoder to perform encoding among the first encoder 1122 and the second encoder 1124. The encoding of the input data x may be performed by the selected encoder, and a bit depth adjustment operation of vector values included in vector data may be performed by a bit depth adjuster connected to the encoder.

The selector 1140 may be a neural network model trained to select an optimal pair of an encoder and a decoder to be applied for encoding and-decoding the input data x based on the input data x. The selector 1140 may generate identification data including a flag value or an index value for identifying the determined encoder-decoder pair. The selector 1140 may determine which pair of encoders and decoders is suitable for each input data x, and transmit the determined result to the multiplexer 1150.

The bit depth adjuster 1130 and the bit depth adjuster 1132 may be connected to the multiplexer 1150, and the multiplexer 1150 may control the connection between the bit depth adjuster 1130 and the bit depth adjuster 1132 and a data storage so that the vector value selected by the selector 1140 is stored in the encoded data $\hat{y}$. In the data storage, each input data x may be encoded and generated vector values may be stored in encoded data. A vector value of a specific bit depth selected by the selector 1140 may be stored in a storage position in the encoded data $\hat{y}$ corresponding to the input data x, and a flag value (or an index value) for identifying a decoder to perform decoding for this vector value of the specific bit depth may be stored in a storage position in the identification data corresponding to the input data x.

The encoded data $\hat{y}$ and the identification data may be transmitted to the decoding module 1160, and the decoding module 1160 may perform decoding on each vector value included in the encoded data $\hat{y}$ based on the identification data. The decoding module 1160 may include a demultiplexer 1170, the first decoder 1182, and the second decoder 1184. The first decoder 1182 may correspond to the first encoder 1122, and the second decoder 1184 may correspond to the second encoder 1124.

The demultiplexer 1170 may determine to which one of the first decoder 1182 or the second decoder 1184 the vector value included in the encoded data $\hat{y}$ is to be transmitted based on the flag value indicated in the identification data.

When first vector data $\hat{y}_1$ included in the encoded data $\hat{y}$ is received from the demultiplexer 1170, the first decoder 1182 may generate reconstructed data $\hat{x}_1\hat{x}_1$ corresponding to the input data x by performing decoding on the received first vector data $\hat{y}_1$. When second vector data $\hat{y}_2$ included in the encoded data $\hat{y}$ is received from the demultiplexer 1170, the second decoder 1184 may generate reconstructed data $\hat{x}_2$ corresponding to the input data x by performing decoding on the received second vector data $\hat{y}_2$.

Therefore, according to embodiments, by compressing data appropriately using a plurality of encoders and decoders with different characteristics, it is possible to provide improved performance (e.g., an image reconstructed with higher image quality or a high compression ratio) compared to a case of using only one encoder, while satisfying the footprint constraint. Embodiments may reduce power consumption by improving the data compression ratio and reducing a bandwidth between an IP and a memory within a SoC. In image data compression, a compression process of encoding may be performed for each block region of an image by an encoder. In embodiments, among a plurality of encoder-decoder pairs, an encoder-decoder pair that is most suitable for encoding and decoding the corresponding block region may be automatically selected by the trained selector 1140, and data encoding and decoding may be performed according to the selected encoder-decoder pair. An optimal encoder-decoder pair may be selected based on the characteristics of the block region. Identification data may include a value for identifying the selected encoder-decoder pair for each block region. The encoder-decoder pairs and the selector 1140 may be trained through machine learning based on loss (e.g., a rate loss and a distortion loss).

Figure 12:
FIG. 12 is a diagram illustrating a data processing system including a data encoding device and a data decoding device according to an embodiment.

FIG. 12 is a diagram illustrating a data processing system including a data encoding device and a data decoding device according to an embodiment.

Referring to FIG. 12, a data processing system may include the data encoding device 1210, the data decoding device 1220, and a network 1230. The data processing system may be utilized in, for example, a content providing device, a video broadcasting device, or a terminal device that performs image data transmission in a video call or video conference, and a mobile application processor (AP).

The data encoding device 1210 may be a device that generates a bit stream by performing encoding (or compression) on data, and transmits the generated bitstream to an external device. The data may include at least one of image data, video data, audio data, and any combination thereof, but embodiments are not limited thereto. The data encoding device 1210 may generate encoded data with a reduced data size by encoding the data, and transmit the generated encoded data, rather than transmitting the entire data, in order to reduce the amount of data transmitted and increase a transmission speed. The data encoding device 1210 may include, for example, a content providing device that provides a data content, a data broadcasting device, or a terminal device that performs data transmission in a data call or data conference, but embodiments are not limited thereto.

The data encoding device 1210 may include the first processor 1215 that performs encoding on data. The first processor 1215 may include an encoding module that generates encoded data by performing encoding on data. The encoding module may perform encoding using an encoder, and obtain a vector value (e.g., a latent vector value) with reduced dimension of the data as a result of performing the encoding. The encoding module may generate encoded data (or compressed data) by collecting the vector values generated for each data. The encoding module may form bit depths of vector values included in the encoded data in a mixed manner. The first processor 1215 may correspond to the first processor 110 described above with reference to FIG. 1, and all or some of the description of the first processor 110 described herein may also be applied to the first processor 1215.

The encoded data generated by the data encoding device 1210 may be transmitted (or transferred) to the data decoding device 1220 using the network 1230. According to the embodiment, the encoded data may be transmitted after additional entropy encoding is performed on the encoded data. The network 1230 may include a wired network of a cable network, a short-range wireless network, or a long-range wireless network. The short-range wireless network may include, for example, Bluetooth, wireless fidelity (Wi-Fi), or infrared data association (IrDA), and the long-range wireless network may include a legacy cellular network, a 3G/4G/5G network, a next-generation communication network, the Internet, or a computer network (e.g., a local area network (LAN) or a wide-area network (WAN)).

The data decoding device 1220 may receive encoded data using the network 1230. The encoded data may be transmitted to the data decoding device 1220 in the form of a bitstream. The encoded data may be transmitted to the data decoding device 1220 using the network 1230, or transmitted to the data decoding device 1220 using one or more other devices. The data decoding device 1220 may be, may include, or may be included in, various types of electronic devices. For example, the data decoding device 1220 may include a portable communication device (e.g., a smartphone), a computer device, a portable multimedia device (e.g., a tablet PC), a camera, a wearable device, a set-top box, a data streaming device, a content storage device, or a home appliance (e.g., a TV), but embodiments are not limited thereto.

The data decoding device 1220 may include the second processor 1225 that performs decoding on the encoded data. The second processor 1225 may include a decoding module that performs decoding using a decoder. The decoding module may perform the decoding, and obtain reconstructed data corresponding to original data as a result of performing the decoding. The second processor 1225 may correspond to the second processor 120 described above with reference to FIG. 1, and all or some of the description of the second processor 120 described herein may also be applied to the second processor 1225.

The data decoding device 1220 may provide a user with the data reconstructed through decoding.

FIG. 1 illustrates an example in which the first processor 110 capable of performing data encoding and the second processor 120 capable of performing data decoding are both included and operated in one electronic device. However, embodiments are not limited thereto. For example, as shown in FIG. 12, the first processor 1215 that performs data encoding may be included in a first electronic device (e.g., the data encoding device 1210), and the second processor 1225 that performs data decoding may be included in a second electronic device (e.g., the data decoding device 1220) that is different from the first electronic device.

Figure 13:
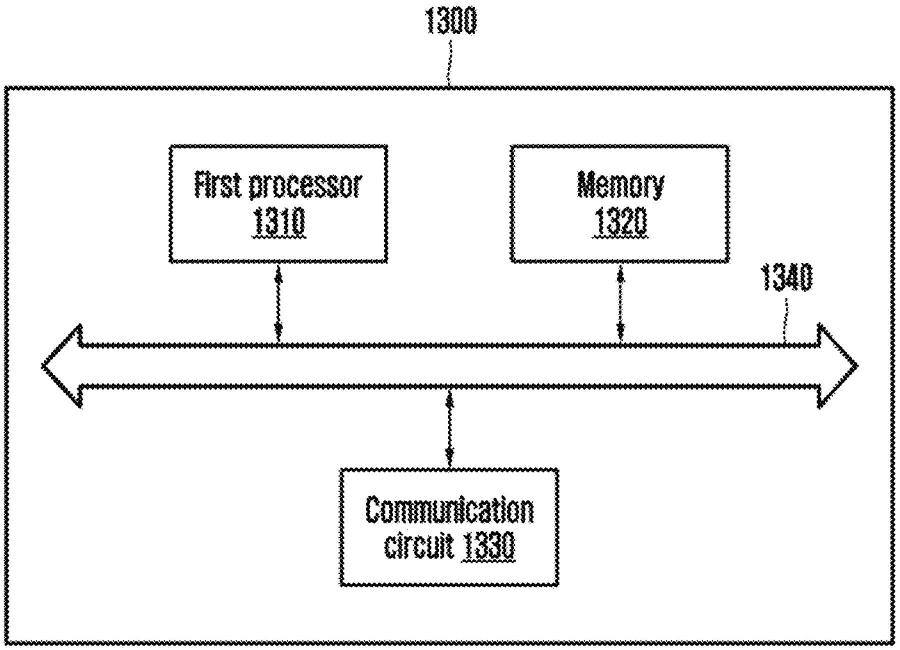
FIG. 13 is a block diagram illustrating components of an electronic device for performing a data processing method of data encoding according to an embodiment.

FIG. 13 is a block diagram illustrating components of an electronic device for performing a data processing method of data encoding according to an embodiment.

Referring to FIG. 13, the electronic device 1300 is a device that performs a data processing method of data encoding, and may correspond to, for example, the data encoding device 1210 of FIG. 12. The electronic device 1300 may include the first processor 1310, a memory 1320, and a communication circuit 1330. The components of the electronic device 1300 may communicate with each other using a communication bus 1340. In an embodiment, at least one (e.g., the communication circuit 1330) of these components may be omitted from the electronic device 1300, or one or more other components (e.g., another processor, a display circuit, and an input circuit) may be added thereto.

The first processor 1310 may control another component (e.g., a hardware or software component) of the electronic device 1300, and may perform a variety of data processing or computation. According to an embodiment, as at least part of data processing or computation, the first processor 1310 may store instructions or data received from another component in the memory 1320, process the instructions or data stored in the memory 1320, and store result data in the memory 1320.

The first processor 1310 may include at least one of a CPU, a GPU, an NPU, an MPU, a DPU, a VPU, a video processor, an image processor, a display processor, a microprocessor, a processor core, a multi-core processor, an ASIC, an FPGA, and any combination thereof. The first processor 1310 may correspond to the first processor 110 described in FIG. 1, and the entirety or a portion of the description of the first processor 110 provided herein may also apply to the first processor 1310.

The memory 1320 may store a variety of data used by a component (e.g., the first processor 1310) of the electronic device 1300. The data may include, for example, a program (e.g., an application), and input data and/or output data related thereto. The memory 1320 may include a volatile memory and/or a non-volatile memory. The memory 1320 may store instructions executable by the first processor 1310.

The communication circuit 1330 may support establishment of a direct (e.g., wired) communication channel or wireless communication channel between the electronic device 1300 and another device (e.g., the electronic device 1400 of FIG. 14), and performance of communication through the established communication channel. The communication circuit 1330 may include a communication processor that operates independently of the first processor 1310 and supports direct (e.g., wired) or wireless communication. The communication circuit 1330 may include a wireless communication module configured to perform wireless communication (e.g., a Bluetooth communication module, a cellular communication module, a Wi-Fi communication module, or a global navigation satellite system (GNSS) communication module) or a wired communication module (e.g., a LAN communication module or a power line communication (PLC) module).

In an embodiment, when the instructions stored in the memory 1320 are executed by the first processor 1310, the first processor 1310 may receive input data, and obtain first vector data in which the input data is encoded from an encoder (e.g., the first encoder 420 of FIGS. 4 and 7) by inputting the input data to the encoder. The first vector data may include a latent vector value corresponding to the input data. The first processor 1310 may obtain first partial vector data having a first bit depth and second partial vector data having a second bit depth by adjusting bit depths of vector values included in the first vector data. The first bit depth may be different from the second bit depth. Each of the first portion and the second portion of the first vector data may include a vector value included in different channel groups among vector values of a plurality of channels included in the first vector data. The first processor 1310 may generate encoded data based on the first partial vector data having the first bit depth and the second partial vector data having the second bit depth. The first processor 1310 may generate the encoded data corresponding to the input data by quantizing merged data in which the first partial vector data and the second partial vector data are merged. According to an embodiment, the first processor 1310 may further perform entropy encoding on the encoded data.

According to another embodiment, the encoding-decoding structure may include a plurality of encoders (e.g., the first encoder 1122 and the second encoder 1124 of FIG. 11) and decoders (e.g., the first decoder 1182 and the second decoder 1184 of FIG. 11) as shown in FIG. 11, and the first processor 1310 may select a vector value to be included in the encoded data among vector values of different bit depths using a selector (e.g., the selector 1140 of FIG. 11) based on a neural network model (e.g., the neural-network-based selector) with the input data as an input. The first processor 1310 may generate identification data for identifying a decoder to decode the selected vector value among the decoders.

Figure 14:
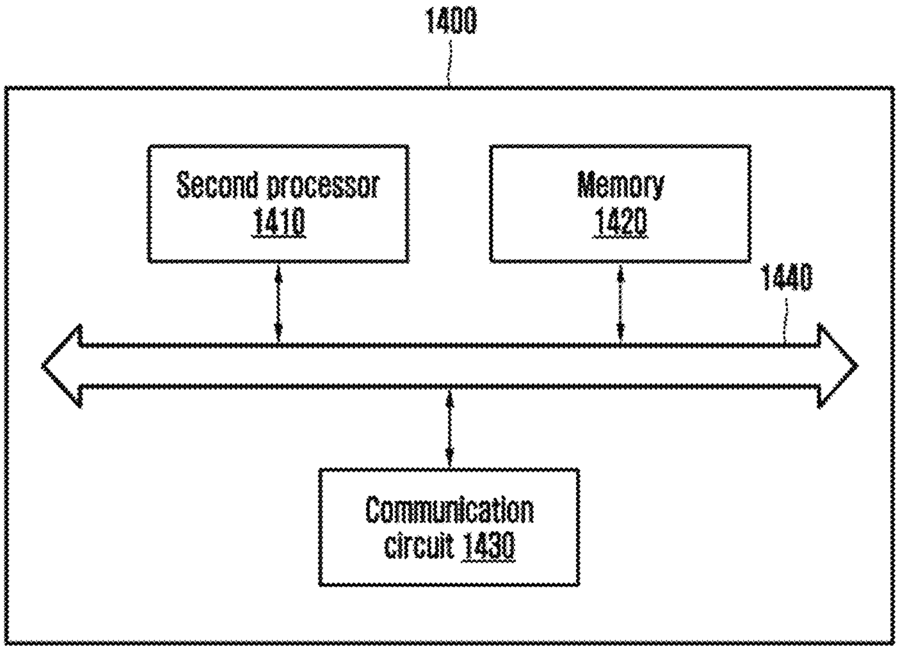
FIG. 14 is a block diagram illustrating components of an electronic device for performing a data processing method of data decoding according to an embodiment.

The first processor 1310 may control the communication circuit 1330 to transmit a bitstream including encoded data, or a bitstream including encoded data and identification data to another device (e.g., the electronic device 1400 of FIG. 14).

FIG. 14 is a block diagram illustrating components of an electronic device for performing a data processing method of data decoding according to an embodiment.

Referring to FIG. 14, the electronic device 1400 is a device that performs a data processing method of data decoding, and may correspond to, for example, the data decoding device 1220 of FIG. 12. The electronic device 1400 may include the second processor 1410, a memory 1420, and a communication circuit 1430. The components of the electronic device 1400 may communicate with each other using a communication bus 1440. In an embodiment, at least one (e.g., the communication circuit 1430) of these components may be omitted from the electronic device 1400, or one or more other components (e.g., another processor, a display circuit, and an input circuit) may be added thereto.

The second processor 1410 may control another component (e.g., a hardware or software component) of the electronic device 1400, and may perform a variety of data processing or computation. According to an embodiment, as at least part of data processing or computation, the second processor 1410 may store instructions or data received from another component in the memory 1420, process the instructions or data stored in the memory 1420, and store result data in the memory 1420.

The second processor 1410 may include at least one of a CPU, a GPU, an NPU, an MPU, a DPU, a VPU, a video processor, an image processor, a display processor, a microprocessor, a processor core, a multi-core processor, an ASIC, an FPGA, and any combination thereof. The second processor 1410 may correspond to the second processor 120 described in FIG. 1, and the entirety or a portion of the description of the second processor 120 provided herein may also apply to the second processor 1410.

The memory 1420 may store a variety of data used by a component (e.g., the second processor 1410) of the electronic device 1400. The memory 1420 may include a volatile memory and/or a non-volatile memory. The memory 1420 may store instructions executable by the second processor 1410.

The communication circuit 1430 may support establishment of a direct (e.g., wired) communication channel or wireless communication channel between the electronic device 1400 and another device (e.g., the electronic device 1300 of FIG. 13), and performance of communication through the established communication channel. The communication circuit 1430 may include a wireless communication module that performs wireless communication or a wired communication module. The communication circuit 1430 may receive a bitstream from another device, for example. The bitstream may include encoded data generated through the data encoding process, or include corresponding encoded data and identification data for identifying a decoder to perform decoding. When the received bitstream is generated through entropy encoding, the second processor 1410 may reconstruct the encoded data by performing entropy decoding on the bitstream.

In an embodiment, according to an example in which there is one decoder, only the encoded data may be transmitted to the second processor 1410, without transmitting the identification data for identifying the decoder. In this case, the second processor 1410 may obtain reconstructed data corresponding to the input data by performing decoding on the first partial vector data having the first bit depth and the second partial vector data having the second bit depth included in the encoded data using a decoder (e.g., the first decoder 450 of FIGS. 4 and 7) based on a neural network model (e.g., the neural-network-based decoder). The second processor 1410 may input first vector data including bit values of different bit depths to a first decoder, and obtain reconstructed data corresponding to output data of the first decoder from the first decoder.

In another embodiment, according to an example in which there are a plurality of decoders, identification data for identifying the decoder may be transmitted to the second processor 1410 together with the encoded data. In this case, the second processor 1410 may select a decoder to decode the vector value included in the encoded data among a plurality of decoders (e.g., the first decoder 1182 and the second decoder 1184 of FIG. 11) based on the identification data. The second processor 1410 may obtain the reconstructed data corresponding to the input data by performing decoding on the vector value included in the encoded data using the selected decoder. The second processor 1410 may identify a decoder to decode each vector value among the decoders based on a value (e.g., a flag value or an index value) of the identification data designated for each vector value included in the encoded data, and perform decoding using the identified decoder.

The embodiments described herein may be implemented using a hardware component, a software component, and/or a combination thereof. A processing device may be implemented using one or more general-purpose or special-purpose computers, such as, for example, a processor, a controller and an arithmetic logic unit (ALU), a digital signal processor (DSP), a microcomputer, a field-programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and/or multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described embodiments may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter.

The above-described hardware devices may be configured to act as one or more software modules in order to perform the operations of the above-described embodiments, or vice versa.

As described above, although some embodiments are described with reference to the drawings, a person skilled in the art may apply various technical modifications and variations based thereon. For example, suitable results may be achieved if the described techniques are performed in a different order, and/or if components in a described system, architecture, device, or circuit are combined in a different manner, or replaced or supplemented by other components or their equivalents.

Therefore, other implementations, other embodiments, and equivalents to the claims are also within the scope of the following claims.

What is claimed is:

1. A method of processing data using a neural network model, the method comprising:

receiving, by a first processor, input data;

obtaining, by the first processor, first vector data in which the input data is encoded, wherein the first vector data is obtained from a first neural-network-based encoder by providing the input data as an input to the first neural-network-based encoder;

converting, by the first processor, a first portion of the first vector data into first partial vector data having a first bit depth;

converting, by the first processor, a second portion of the first vector data into second partial vector data having a second bit depth different from the first bit depth; and generating, by the first processor, encoded data by quantizing the first partial vector data and the second partial vector data.

2. The method of claim 1, further comprising:

receiving, by a second processor, the encoded data; and obtaining, by the second processor, reconstructed data corresponding to the input data by performing decoding on the first partial vector data and the second partial vector data using a first neural-network-based decoder.

3. The method of claim 1, wherein each of the first portion and the second portion comprises a vector value included in different channel groups from among vector values of a plurality of channels included in the first vector data, and wherein the first bit depth is greater than the second bit depth.

4. The method of claim 1, wherein the encoded data is generated by quantizing merged data in which the first partial vector data and the second partial vector data are merged.

5. The method of claim 1, further comprising:

generating, by the first processor, a bitstream by entropy-encoding the encoded data.

6. The method of claim 1, further comprising:

obtaining, by the first processor, second vector data in which the input data is encoded, wherein the second vector data is obtained from a second neural-network-based encoder by providing the input data as an input to the second neural-network-based encoder; and converting, by the first processor, the second vector data into converted second vector data having a third bit depth.

7. The method of claim 6, wherein the third bit depth is smaller than the first bit depth and greater than the second bit depth.

8. The method of claim 6, wherein a data size of the converted second vector data having the third bit depth is the same as a data size of the first vector data comprising the first partial vector data having the first bit depth and the second partial vector data having the second bit depth.

9. The method of claim 6, wherein the generating of the encoded data comprises: selecting, by the first processor, a vector value to be included in the encoded data using a neural-network-based selector based on the input data, and wherein the vector value is selected from among a first vector value having the first bit depth included in the first partial vector data, a second vector value having the second bit depth included in the second partial vector data, and a third vector value having the third bit depth included in the converted second vector data.

10. The method of claim 9, wherein the encoded data comprises the selected vector value and identification data for identifying a decoder for decoding the selected vector value.

11. The method of claim 10, further comprising:

receiving, by a second processor, the encoded data and the identification data;

selecting, by the second processor, the decoder from among a plurality of decoders based on the identification data; and obtaining, by the second processor, reconstructed data corresponding to the input data by performing decoding on the selected vector value using the selected decoder, wherein the plurality of decoders comprise a first decoder corresponding to the first neural-network-based encoder and a second decoder corresponding to the second neural-network-based encoder.

12. The method of claim 2, wherein the input data comprises image data, wherein the encoded data comprises encoded image data, and wherein the reconstructed data comprises reconstructed image data that is generated by performing the decoding on the encoded image data.

13. The method of claim 2, wherein the encoded data is provided to the second processor by being transmitted from the first processor to the second processor, or being output from the first processor, stored in a memory, and then transmitted to the second processor, and wherein the first processor, the second processor, and the memory are included in a system-on-chip (SoC) module.

14. A method of processing data using a neural network model, the method comprising:

receiving, by a first processor, input data;

obtaining, by the first processor, first vector data in which the input data is encoded, wherein the first vector data is obtained from a first neural-network-based encoder by providing the input data as an input to the first neural-network-based encoder;

converting, by the first processor, the first vector data into converted first vector data having a first bit depth;

obtaining, by the first processor, second vector data in which the input data is encoded, wherein the second vector data is obtained from a second neural-network-based encoder by providing the input data as an input to the second neural-network-based encoder;

converting, by the first processor, the second vector data into converted second vector data having a second bit depth;

selecting, by the first processor, a vector value to be included in encoded data from among a vector value having the first bit depth included in the converted first vector data and a vector value having the second bit depth included in the converted second vector data, using a neural-network-based selector based on the input data; and generating, by the first processor, the encoded data comprising the selected vector value and identification data indicating a decoder for decoding the selected vector value.

15. The method of claim 14, further comprising:

receiving, by a second processor, the encoded data and the identification data;

selecting, by the second processor, the decoder for decoding the selected vector value from among a plurality of decoders based on the identification data; and obtaining, by the second processor, reconstructed data corresponding to the input data by performing the decoding on the selected vector value using the selected decoder, wherein the plurality of decoders comprise a first decoder corresponding to the first neural-network-based encoder and a second decoder corresponding to the second neural-network-based encoder.

16. An electronic device for processing data, the electronic device comprising:

a first processor; and a memory configured to store instructions which, when executed by the first processor, cause the first processor to:

receive input data;

obtain first vector data in which the input data is encoded, wherein the first vector data is obtained from a first neural-network-based encoder by providing the input data as an input to the first neural-network-based encoder;

convert a first portion of the first vector data into first partial vector data having a first bit depth, and convert a second portion of the first vector data into second partial vector data having a second bit depth different from the first bit depth; and generate encoded data by quantizing the first partial vector data and the second partial vector data.

17. The electronic device of claim 16, further comprising:

a second processor, wherein the memory is further configured to store instructions which, when executed by the second processor, cause the second processor to:

receive the encoded data; and obtain reconstructed data corresponding to the input data by performing decoding on the first partial vector data and the second partial vector data using a first neural-network-based decoder.

18. The electronic device of claim 16, wherein the instructions further cause the first processor to:

obtain second vector data in which the input data is encoded, wherein the second vector data is obtained from a second neural-network-based encoder by providing the input data as an input to the second neural-network-based encoder; and convert the second vector data into converted second vector data having a third bit depth, and wherein the third bit depth is smaller than the first bit depth and greater than the second bit depth.

19. The electronic device of claim 18, wherein the instructions further cause the first processor to:

select a vector value to be included in the encoded data from among a vector value having the first bit depth included in the first partial vector data, a vector value having the second bit depth included in the second partial vector data, and a vector value having the third bit depth included in the converted second vector data, using a neural-network-based selector with the input data as an input; and generate the encoded data comprising the selected vector value and identification data for identifying a decoder for decoding the selected vector value.

20. The electronic device of claim 19, further comprising:

a second processor, wherein the memory is further configured to store instructions which, when executed by the second processor, cause the second processor to:

receive the encoded data and the identification data;

select the decoder for decoding the selected vector value from among a plurality of decoders based on the identification data; and obtain reconstructed data corresponding to the input data by performing the decoding on the selected vector value using the selected decoder, and wherein the plurality of decoders comprise a first decoder corresponding to the first neural-network-based encoder and a second decoder corresponding to the second neural-network-based encoder.

* * * * *